United States Patent
Armacost et al.

(10) Patent No.: US 9,543,696 B2
(45) Date of Patent: Jan. 10, 2017

(54) QUICK REPLACEMENT CONNECTOR

(71) Applicant: Peterson Manufacturing Company, Grandview, MO (US)

(72) Inventors: David Shaw Armacost, Leawood, KS (US); Mark Pecaro, Shawnee, KS (US)

(73) Assignee: PETERSON MANUFACTURING COMPANY, Grandview, MO (US)

( * ) Notice: Subject to any disclaimer, the term of this patent is extended or adjusted under 35 U.S.C. 154(b) by 0 days.

(21) Appl. No.: 14/616,436

(22) Filed: Feb. 6, 2015

(65) Prior Publication Data

US 2015/0222049 A1 Aug. 6, 2015

Related U.S. Application Data

(60) Provisional application No. 61/936,667, filed on Feb. 6, 2014.

(51) Int. Cl.
| | |
|---|---|
| *H01R 11/30* | (2006.01) |
| *H01R 13/622* | (2006.01) |
| *B60D 1/64* | (2006.01) |
| *H01R 13/52* | (2006.01) |
| *H01R 11/28* | (2006.01) |
| *H01R 13/58* | (2006.01) |

(52) U.S. Cl.
CPC ............. *H01R 13/622* (2013.01); *B60D 1/64* (2013.01); *H01R 11/28* (2013.01); *H01R 13/5213* (2013.01); *H01R 13/5845* (2013.01); *H01R 2201/26* (2013.01)

(58) Field of Classification Search
CPC ...... H01R 13/73; H01R 2201/26; H01R 31/06
USPC ................... 439/839, 35, 483, 484
See application file for complete search history.

(56) References Cited

U.S. PATENT DOCUMENTS

| | | | | |
|---|---|---|---|---|
| 465,430 | A * | 12/1891 | Desant ........................ | 24/707.2 |
| 2,962,688 | A * | 11/1960 | Werner .............. | H01R 13/5219 285/901 |
| 6,945,822 | B2 * | 9/2005 | Flemming .............. | H01R 31/06 439/638 |
| 7,097,469 | B2 * | 8/2006 | Jacobs ................ | H01R 13/502 439/246 |
| 7,748,986 | B1 * | 7/2010 | Parnapy ................ | B60T 13/665 439/34 |

* cited by examiner

*Primary Examiner* — Phuong Dinh
(74) *Attorney, Agent, or Firm* — Polsinelli PC

(57) ABSTRACT

Implementations described and claimed herein provide apparatuses, systems, and methods for a quick maintenance of an electrical connector, such as a SAE J560 compliant connector. In one implementation, a connector includes a cable bundling wires extending into a housing having a body extending between a proximal end and a distal end. A distal terminal holder is disposed within an opening of the body at the proximal end. The distal terminal holder has a surface oriented in a direction away from the body. Terminals extend from the surface of the distal terminal holder, and each of the terminals is in electrical communication with one of the wires. Terminal assemblies each have a distal opening into which one of the terminals extends. A proximal terminal holder has terminal openings extending from a distal surface to a proximal surface, and each of the terminal assemblies extends through one of the terminal openings.

13 Claims, 30 Drawing Sheets

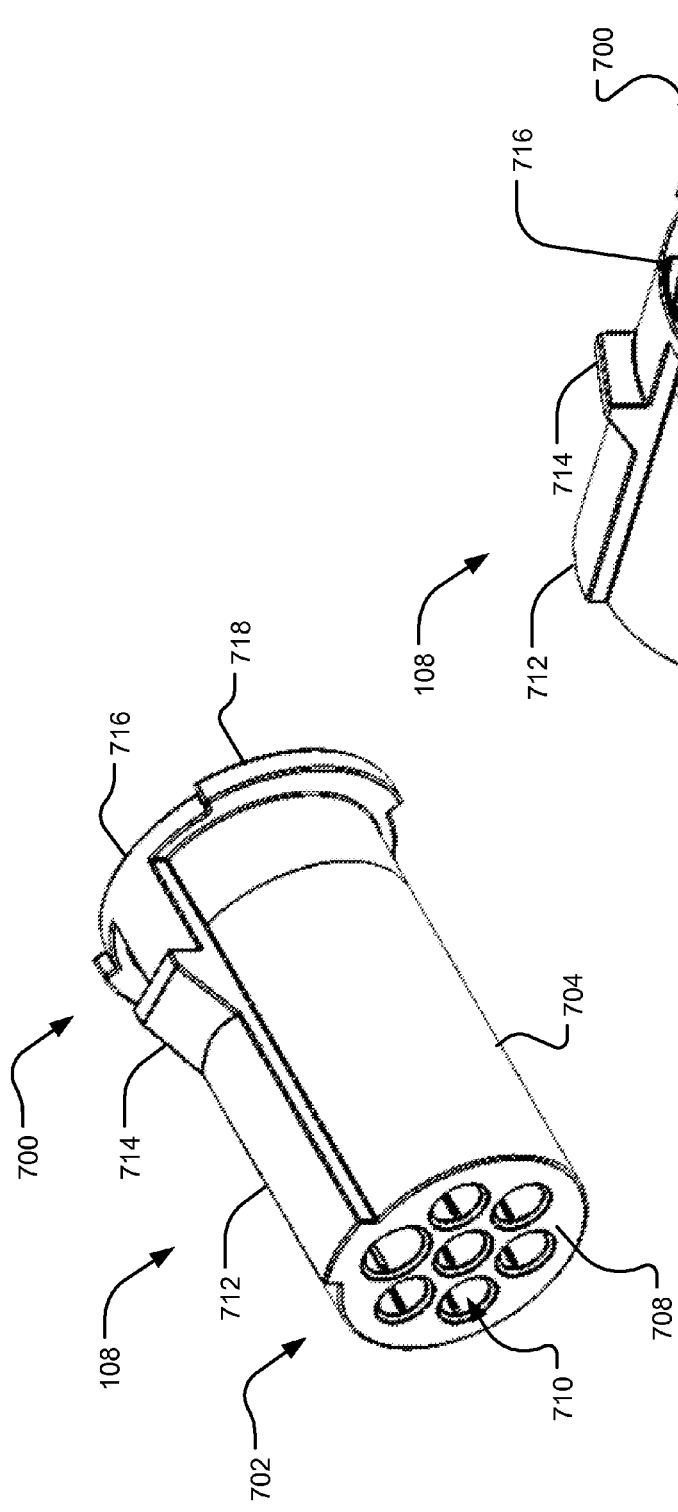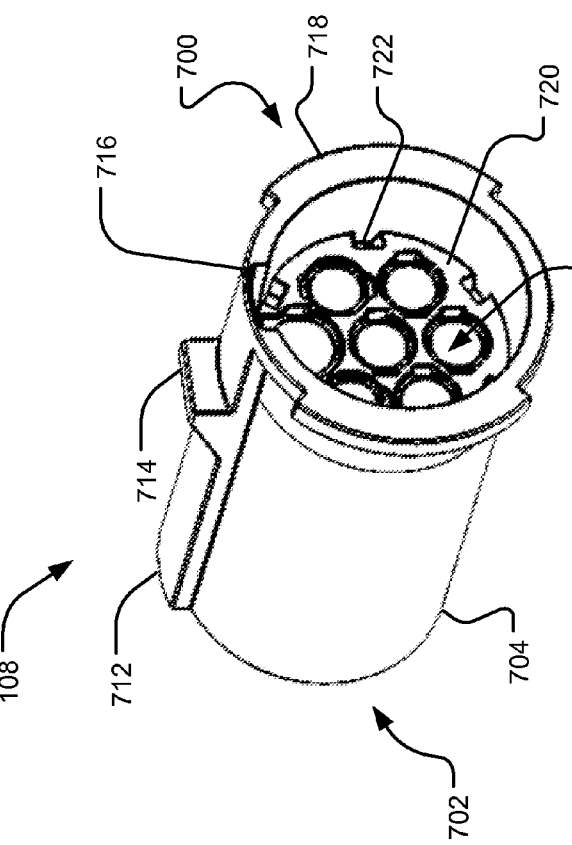
FIG. 24A
FIG. 24B

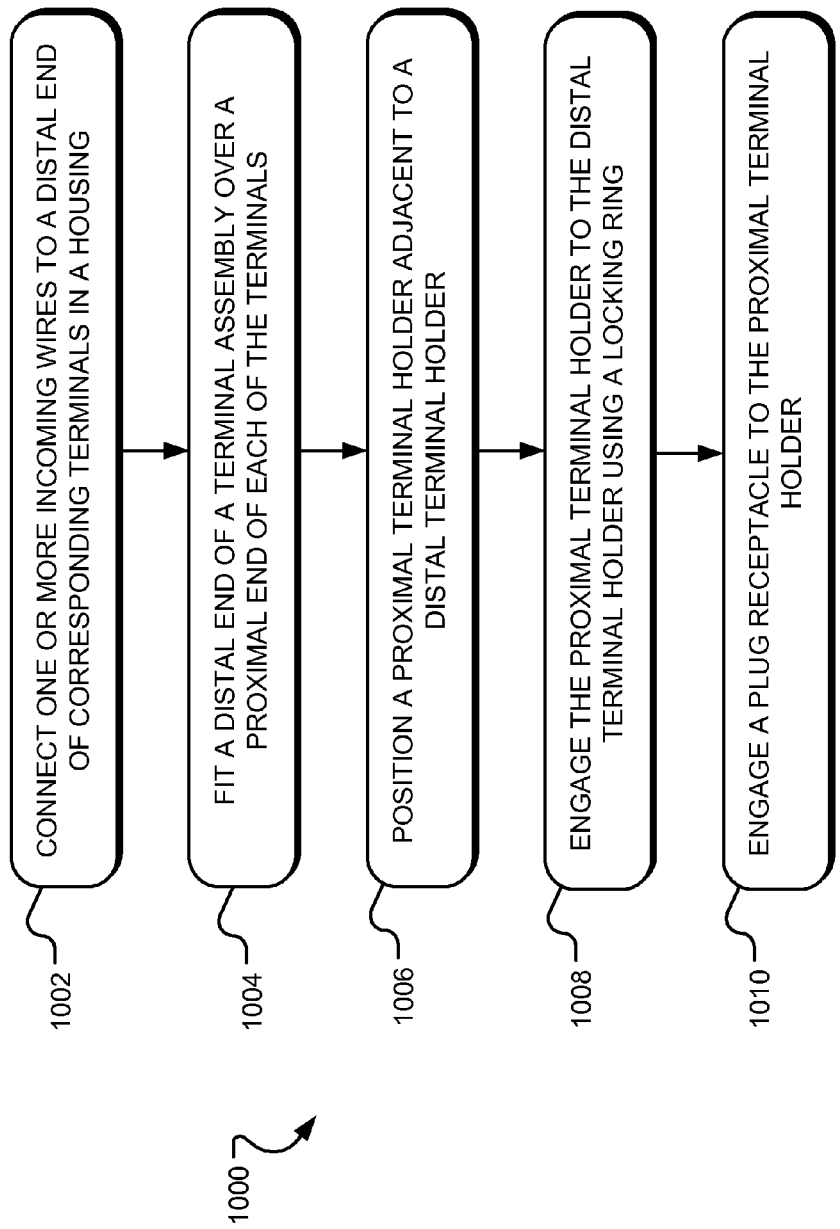

QUICK REPLACEMENT CONNECTOR

CROSS-REFERENCE TO RELATED APPLICATIONS

The present application claims benefit of priority under 35 U.S.C. §119(e) to U.S. Provisional Patent Application No. 61/936,667, entitled "Apparatus for a Quick Replacement Connector" and filed on Feb. 6, 2014, which is specifically incorporated by reference in its entirety herein.

TECHNICAL FIELD

Aspects of the present disclosure relate to electrical connectors, and more particularly to electrical connectors disposed at an end of a multipath electrical cable for electrical connection between a towing vehicle and a towed vehicle.

BACKGROUND

When towing a vehicle, either directly or indirectly (e.g., using a trailer), various vehicle lights should be visible to other drivers. Because the towed vehicle obscures the lights of the towing vehicle, all towed vehicles generally must have working taillights and brake lights, at a minimum. An electrical connection between the towed and towing vehicles to provide such working lights often involves a multifunction electrical connector. Generally, such connectors are governed by specifications set forth by Society of Automotive Engineers (SAE) J560 and involve multiple (e.g., seven) terminals to provide a connection to the various electronic systems operating on the towed vehicle.

While towing, the connector is engaged to a socket of the towed vehicle to establish the electrical connection between the towing and towed vehicles. The connector is disengaged from the socket when towing is complete. As a result of the repeated connection and disconnection of the connector and the socket, various components of the connector often degrade, such that the electrical connection between the towing and towed vehicles becomes inconsistent or otherwise unsuitable. Moreover, other events, such as an outside source (e.g., the road) striking a portion of the connector may cause damage.

When the connector provides an inconsistent electrical connection or otherwise becomes inoperable or unsuitable, the connector is conventionally replaced in its entirety to ensure proper functioning of the electrical systems of the towed vehicle. Replacing the connector in its entirety for maintenance generally becomes costly. The connector is often replaced in its entirety because the design, manufacturing, and assembly of conventional connectors generally make repair or replacement of components impractical. Generally, as discussed above, J560 connectors involve seven separate terminals for connecting six different electrical systems on the towed vehicle and include a ground return. Each of these terminals is connected to a relatively low gauge (i.e., large) wire, with the wires each insulated. The insulated wires are collectively bundled in a common jacket as a single cable. Typically, each of the wires is soldered or sonically welded to the connector for electrical communication with the terminals. The nature of these connections, among other issues, renders the replacement of a J560 connector a burdensome process involving: severing the wires to remove the connector; stripping the outer jacket of the cable to expose the individual wires; stripping the insulation of the individual wires; and connecting (e.g., sonically welding or soldering) the wires to corresponding lead wires on a new J560 connector. Accordingly, maintenance of connectors (e.g., repair or replacement) is often challenging, time consuming, and costly, and may require the use of specialized tools.

It is with these observations in mind, among others, that various aspects of the present disclosure were developed.

SUMMARY

Implementations described and claimed herein address the foregoing problems, among others, by providing systems, methods, and apparatuses for quick maintenance of connectors. In one implementation, a connector includes a cable assembly having a cable bundling a plurality of wires extending into and terminating within a housing. The housing has a housing body extending between a proximal end and a distal end. A handle projects from a body of the housing and is positioned near the proximal end of the housing body. The cable extends into the housing at the distal end of the housing body. A distal terminal holder is disposed within an opening of the housing body at the proximal end. The distal terminal holder has a surface oriented in a direction away from the housing body. A plurality of terminals extends from the surface of the distal terminal holder, and each of the terminals is in electrical communication with one of the wires. A plurality of terminal assemblies each has a distal opening into which one of the terminals extends. A proximal terminal holder has a plurality of terminal openings extending from a distal surface to a proximal surface, and each of the terminal assemblies extends through one of the terminal openings.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIGS. 24A and 24B depict an isometric view and a distal perspective view, respectively, of an example proximal terminal holder.

FIG. 30 illustrates example operations for assembling a quick replacement connector.

DETAILED DESCRIPTION

Aspects of the present disclosure involve systems, methods, and apparatuses for quick replacement, repair, and/or maintenance of connectors, such as a SAE J560 compliant connector of a towing vehicle for connecting to a socket of a towed vehicle. In one aspect, a quick replacement connector is configured for efficient and cost effective disassembling and reassembling for replacement, repair, or other maintenance of one or more components of the connector. Stated differently, the quick replacement connector facilitates the maintenance of various components of the connector susceptible to degradation, such as wear, damage, and/or failure. The quick replacement connector includes a quick-change maintenance component for a replaceable portion of the connector that is prone to degradation cause by the repeated connection and disconnection of the connector and the socket of the towed vehicle, among other contributing factors. The replaceable portion of the connector is separated from the remainder of the connector not subject to the degradation, thereby enabling fast and effective maintenance of the replaceable portion without disturbing the remainder of the connector. The quick replacement connector further includes a twisting lock mechanism for the locking and unlocking of the quick-change component of the connector and a cable assembly with a trigger-grip to provide a better grip for a user when assembling, disassembling, or otherwise working with the quick-replacement connector.

The various systems, apparatuses, and methods disclosed herein generally provide for quick maintenance of various components of an electrical connector susceptible to degradation. The example implementations discussed herein reference SAE J560 compliant connectors for providing an electrical connection between a towing vehicle and a towed vehicle. However, it will be appreciated by those skilled in the art that the presently disclosed technology is applicable to other electrical connectors.

Figure 1:
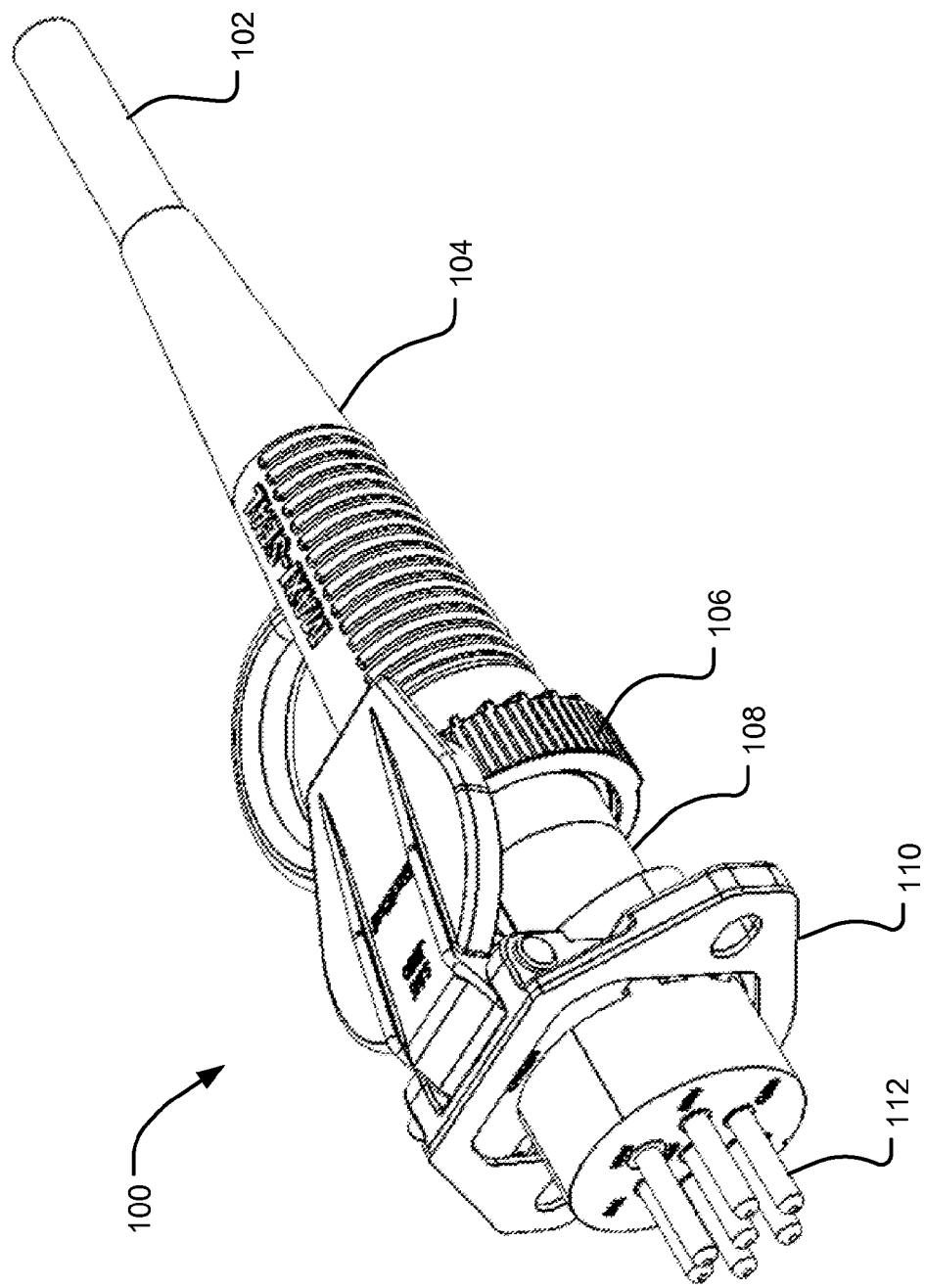
FIG. 1 illustrates an example quick replacement connector.
Figure 2:
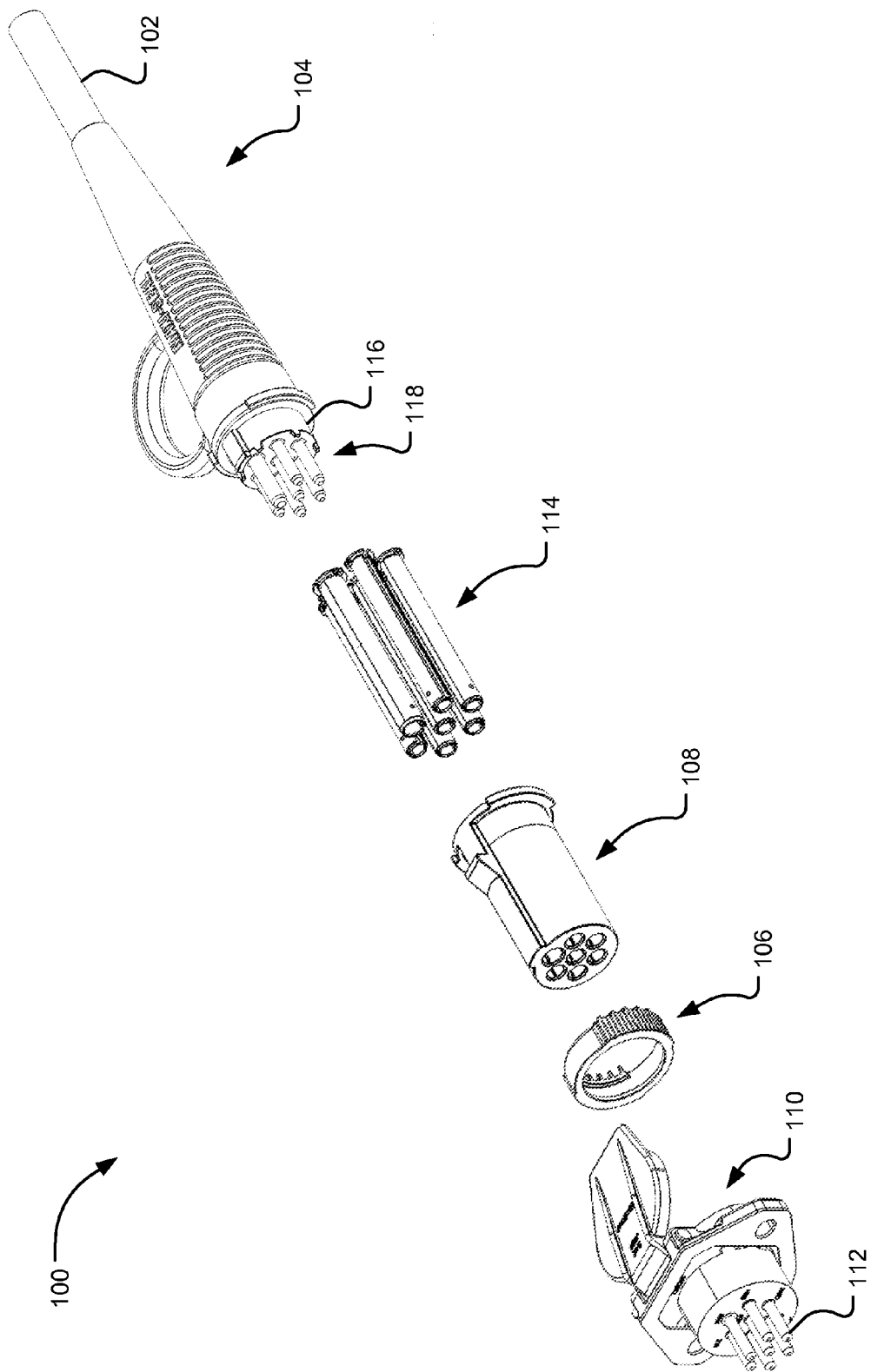
FIG. 2 shows an exploded view of the connector of FIG. 1.

To begin a detailed description of an example quick replacement connector 100, reference is made to FIGS. 1-2, which illustrate isometric and exploded views, respectively, of the connector 100. The connector 100 is configured to removably engage a socket to provide a removable electrical connection between a towing vehicle and a towed vehicle.

In one implementation, a cable 102, having an outer jacket enclosing a bundle of wires, extends into a housing 104 of a cable assembly. The wires may each include an individual insulation jacket within the cable 102. The wires of the cable 102 provide power to and communicate with the various electrical systems of the towed vehicle via the connector 100. Such electrical systems may include, without limitation, clearance markers, license plate lighting, taillights, left and right turn lights, brake lights, an antilock brake system, auxiliary systems, and any other components or systems operating on the towed vehicle and powered by the towing vehicle. In one implementation, the connector 100 is a SAE J560 compliant connector configured to engage a compliant socket (e.g., a receptacle 110) corresponding to a towed vehicle. In this implementation, the cable 102 includes seven wires corresponding to seven connection points in the connector 100 and the receptacle 110, as shown in the examples illustrated in the Figures. It will be appreciated by those skilled in the art, however, that any number of wires and/or connections may be involved.

In one implementation, the receptacle 110 is mounted to the towed vehicle, such that the connector 100 may be connected and disconnected as needed for towing. To provide an electrical connection between the cable 102 and the towed vehicle during towing, in one implementation, the connector 100 engages the receptacle 110 to electrically communicate with proximal terminals 112 extending from the receptacle 110 and into the towed vehicle.

The proximal terminals 112 are in electrical communication with the wires of the cable 102 via internal electrical connection points extending through the housing 104 and a proximal terminal holder 108. For example, as shown in FIG. 2, in one implementation, distal terminals 118 extend proximally from the housing 104 through a distal terminal holder 116. The distal terminals 118 are in electrical communication with the wires of the cable 102 via internal connection points enclosed within the housing 104, as described herein. One or more terminal assemblies 114 are configured to electrically connect, either directly or indirectly, the distal terminals 118 to the proximal terminals 112 when the connector 100 is plugged into the receptacle 110. In one implementation, the terminal assembly 114 includes a body extending from a distal surface to a proximal surface with one or more openings corresponding to the distal terminals 112 extending therethrough. In another implementation, a plurality of terminal assemblies 114 are provided, each of the terminal assemblies 114 corresponding to one of the distal terminals 118 as shown in FIG. 2. The proximal terminal holder 108 is configured to receive and house the terminal assemblies 114.

As can be understood from FIGS. 1-2, the connector 100 is amenable to quick assembly and disassembly, facilitating maintenance (e.g., repair, replacement, etc.) of various components susceptible to degradation without impacting the remaining components. In one implementation, a locking ring 106 may be removed to unlock and disassemble a quick-change portion of the connector 100, which may include one or more of: the proximal terminal holder 108, the terminal assemblies 114, the distal terminal holder 116, and the distal terminals 118.

Figure 3:
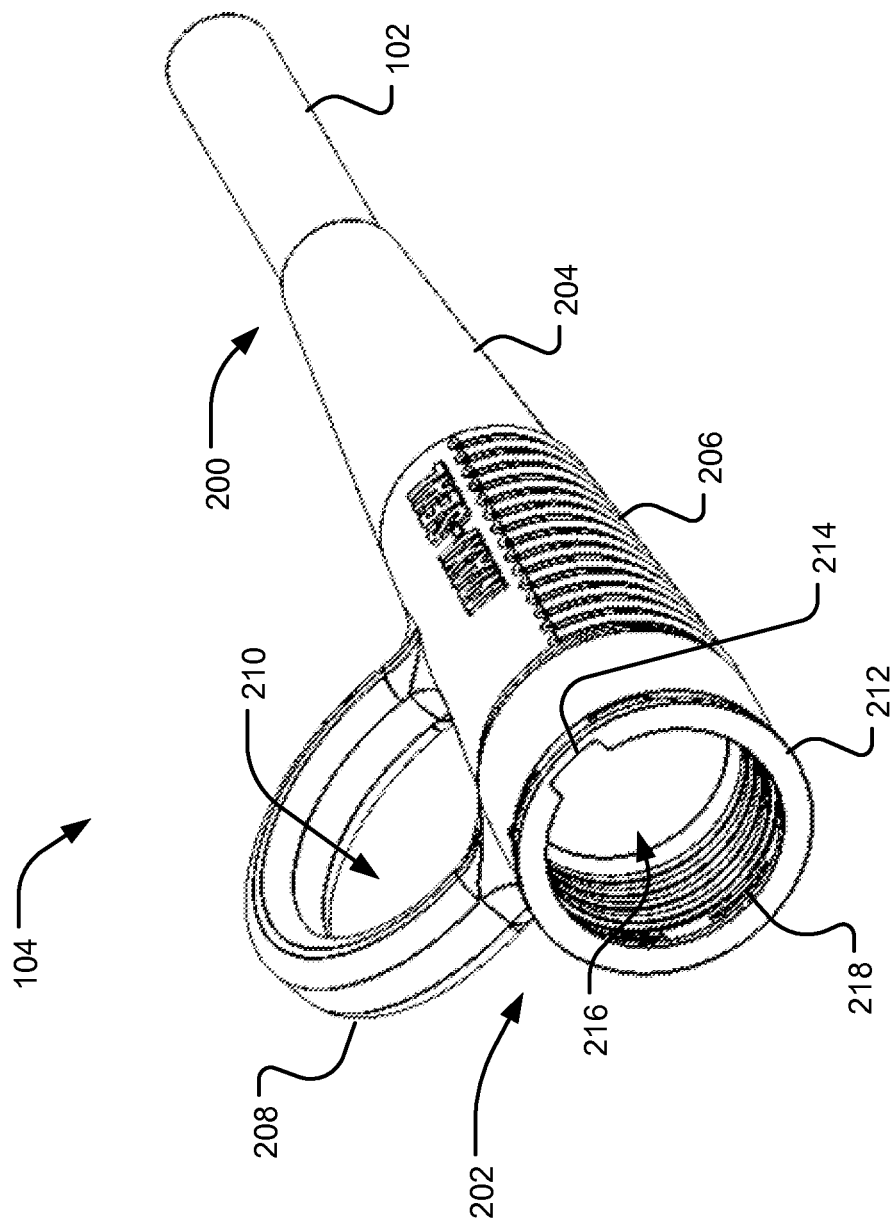
FIG. 3 depicts an isometric view of an example cable assembly.
Figure 4:
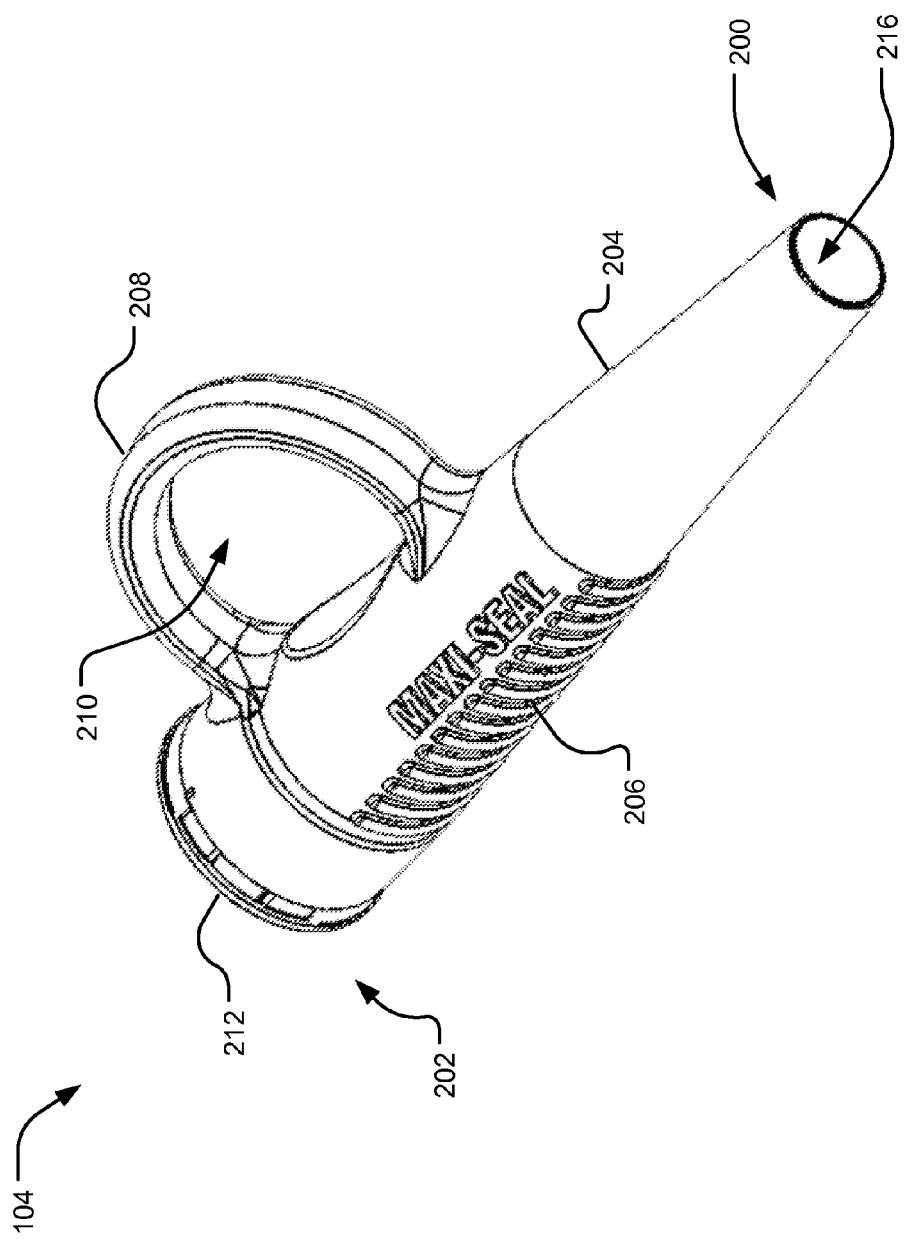
FIG. 4 shows a distal perspective view of a housing of the cable assembly of FIG. 3.
Figure 5:
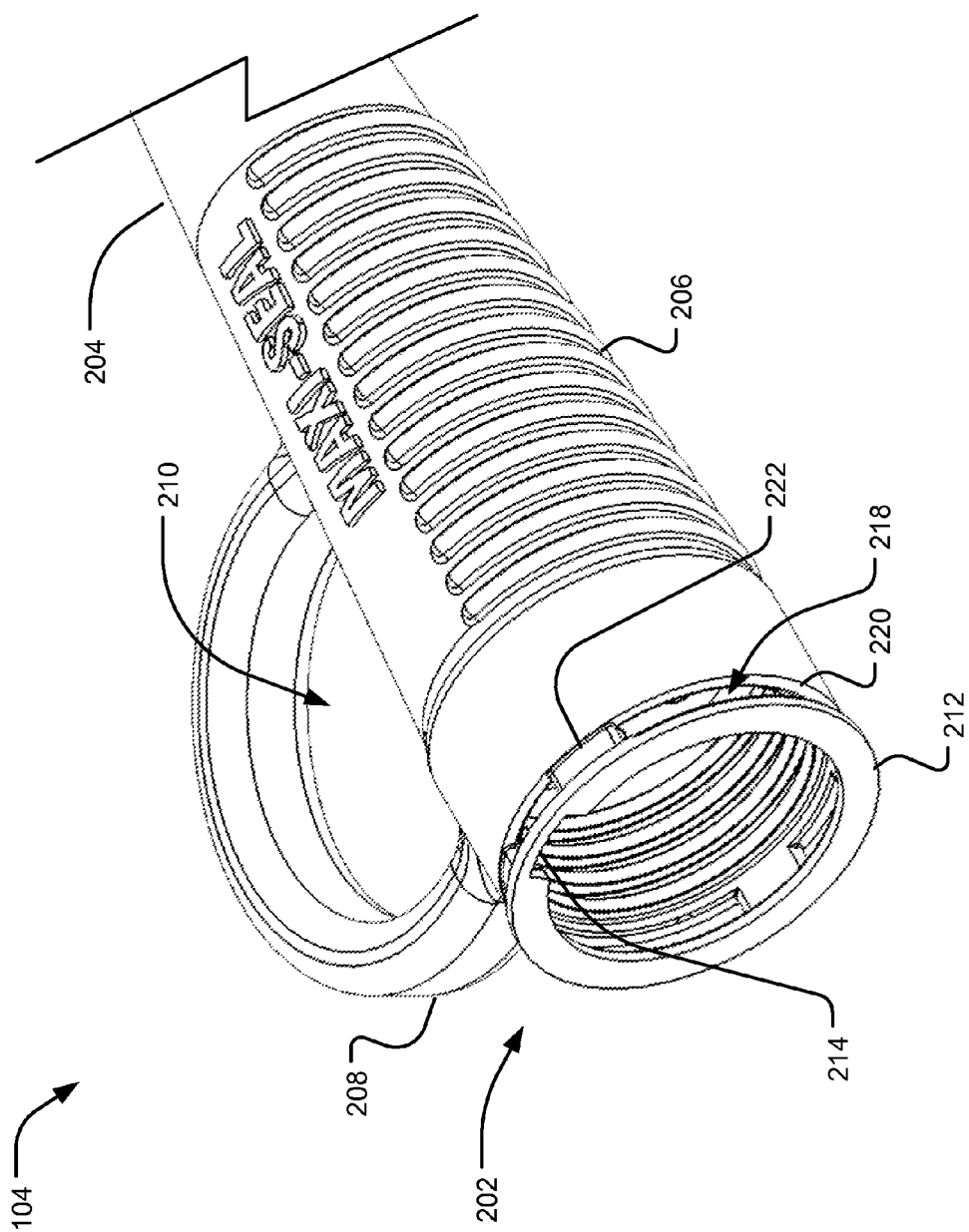
FIG. 5 illustrates a detailed view of a proximal end of the housing of the cable assembly of FIG. 3.

Turning to FIGS. 3-18, a detailed description of the internal connections between the cable 102 and the distal terminals 118 is provided. To begin the discussion, reference is made to FIGS. 3-5 showing different views of the housing 104 of the cable assembly.

In one implementation, the housing 104 includes an elongated body 204 extending between a distal end 200 and a proximal end 202. The housing 104 may have a variety of shapes and sizes and may be made from various weather and debris resistant materials, including, but not limited to, plastic, rubber, metal, and/or other durable materials. In one implementation, to assist a user during assembly and disassembly of the connector 100, as well as connection and disconnection of the connector 100 to the receptacle 110, among other activities, the housing 104 includes a grip 206 and a handle 208 with an opening 210 adapted to receive one or more fingers of the user. The grip 206 may be formed by grooves in the surface of the housing 104 adapted to provide additional friction during gripping of the housing 104. The handle 208 extends from the body 204 and may have a variety of shapes and orientations to facilitate manipulation of the connector 100 by providing additional leverage and creating a strain relief between the cable 102 and the housing 104. For example, the handle 208 may be shaped and oriented to provide a trigger grip, as shown in FIGS. 3-4.

An opening 216 extends through the body 204 between the distal end 200 and the proximal end 202, thereby providing a protected interface between the cable 102 and the distal terminals 118. Within the body 204, the wires of the cable 102 are connected to the distal terminals 118, directly or indirectly, via internal connection points. The wires may connect to the internal connection points in a variety of manners, including, without limitation, soldering, sonic welding, wire terminators, and the like.

In one implementation, the elongated body 204 tapers distally, such that a sealed or otherwise weather and debris resistant connection is created between the distal end 200 and the cable 102. At the proximal end 202, in one implementation, the opening 216 is defined by a rim 212 connected to an edge 220 via an extension 222. The proximal end 202 includes one or more features for engaging the distal terminal holder 116. In one implementation, an interior surface of the body 204 includes threads 218 for receiving and engaging the distal terminal holder 116 using a twisting motion. A notch 214 may be defined in the rim 212 to orient the distal terminal holder 116, and one or more channels 218 may be defined by the rim 212, the extensions 22, and the edge 220. The channels 218 are adapted to receive and hold corresponding features of the distal terminal holder 116, as described with respect to FIGS. 6 to 9.

Figure 6:
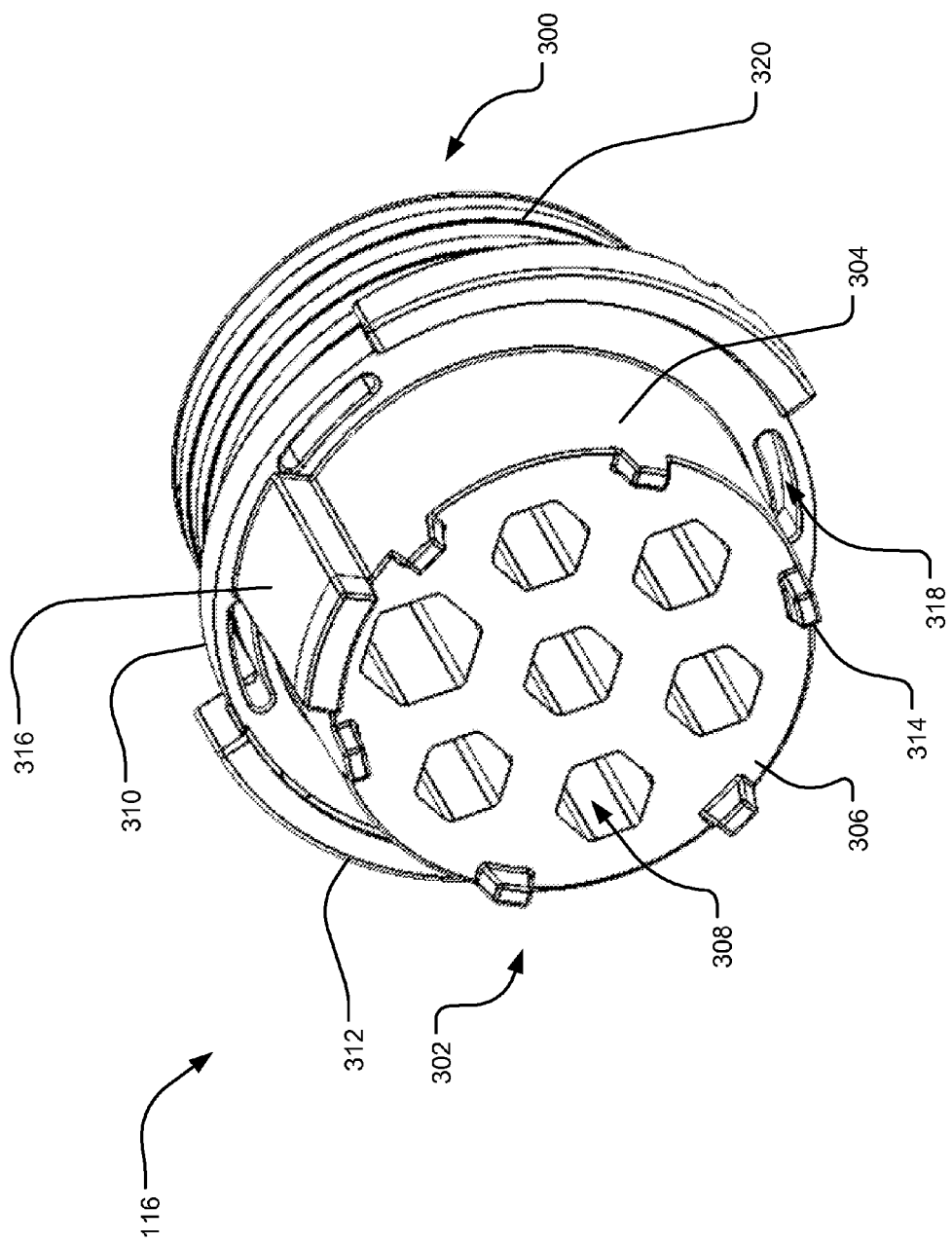
FIG. 6 shows an isometric view of an example distal terminal holder.
Figure 7:
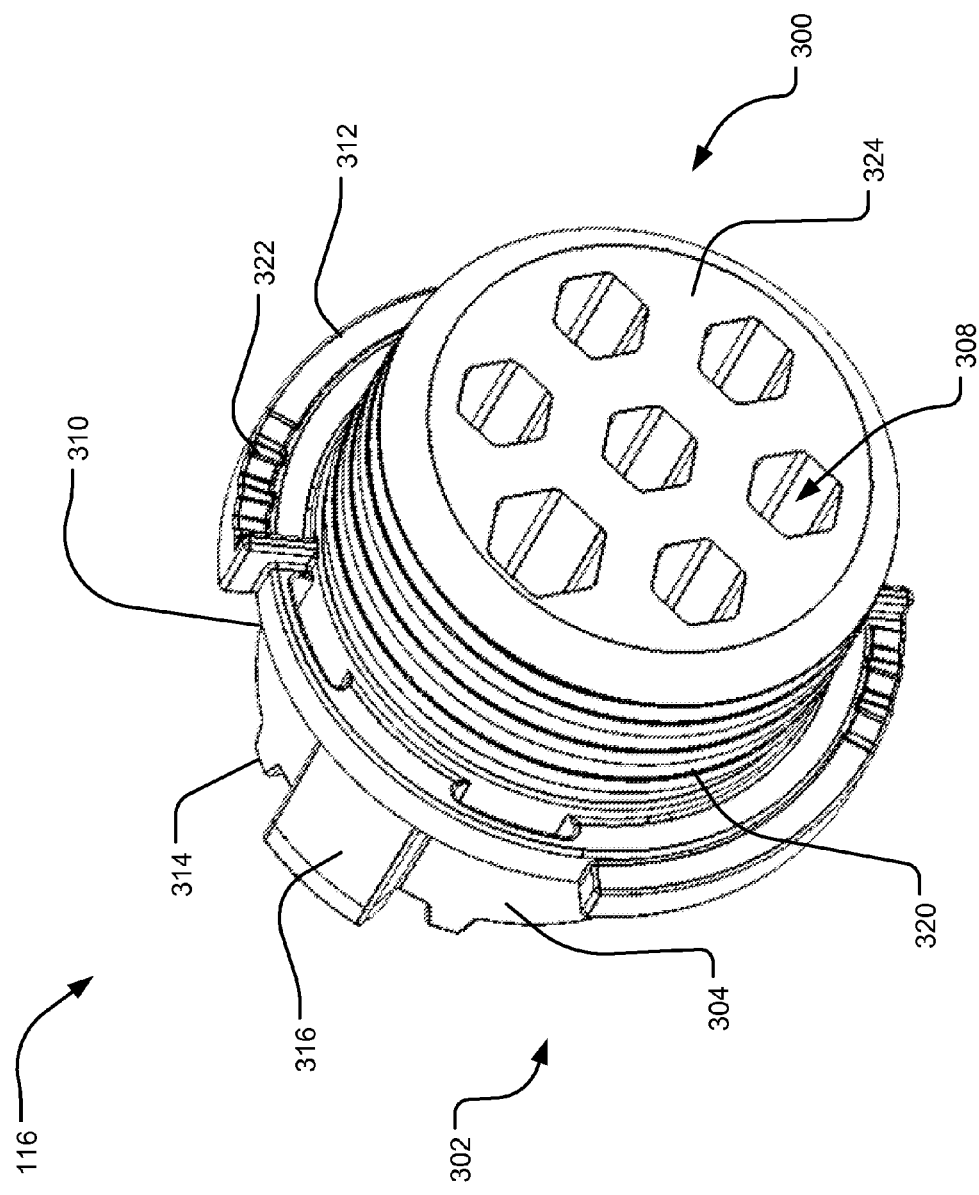
FIG. 7 shows a distal perspective view of the distal terminal holder of FIG. 6.
Figure 8:
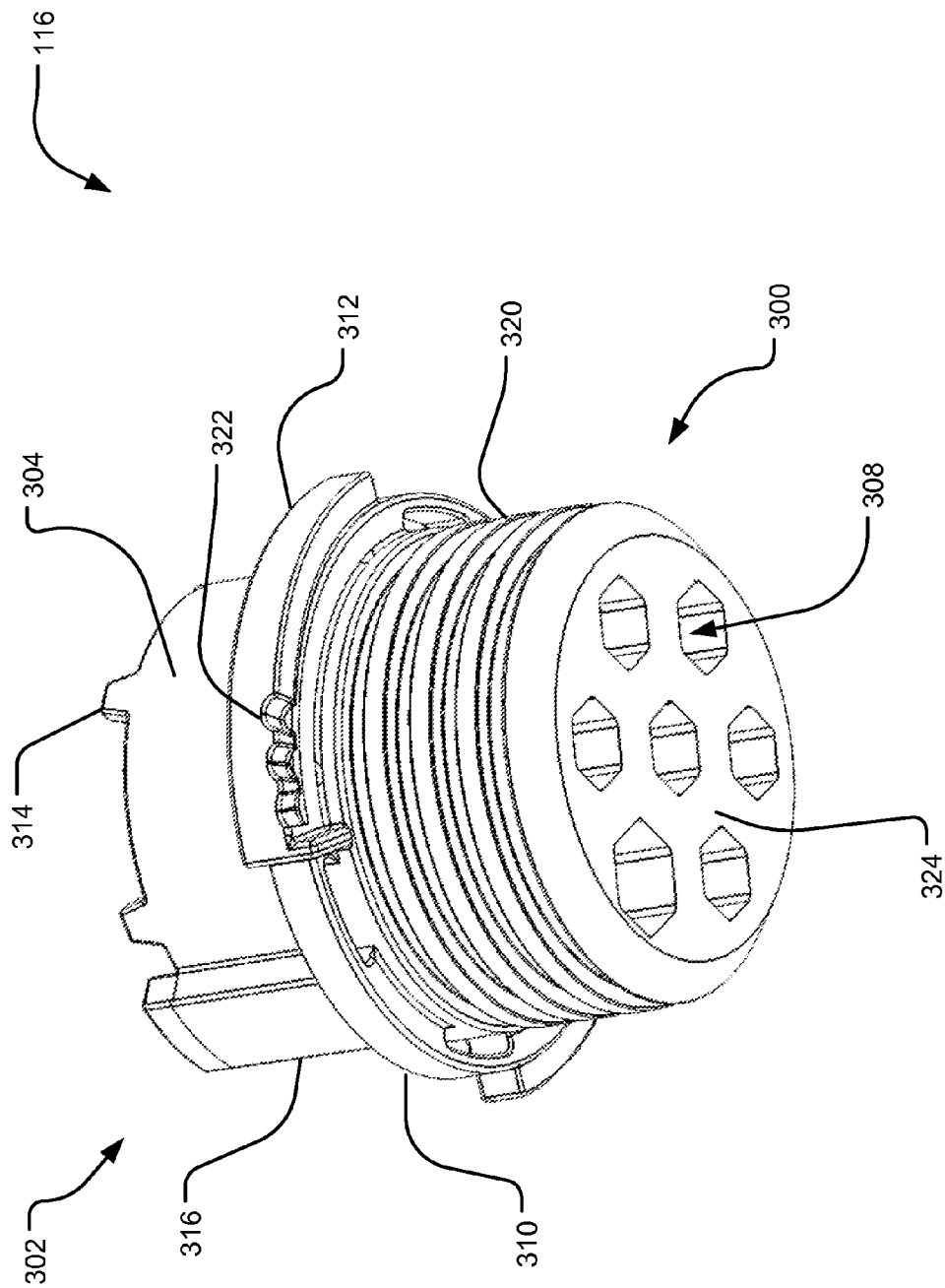
FIG. 8 illustrates a side perspective view of the distal terminal holder of FIG. 6.

As can be understood from FIGS. 6-8, in one implementation, the distal terminal holder 116 includes a body 304 extending between a distal end 300 to a proximal end 302. One or more terminal openings 308 extend through the body 304 from a proximal surface 306 to a distal surface 324. The terminal openings 308 are sized and shaped to receive and hold the distal terminals 118. In one implementation, the terminal openings 308 and the corresponding distal terminals 118 may be different sizes depending on the wire connection. Moreover, the terminal openings 308 may be arranged in a variety of orientations depending on the orientation of the proximal terminals 112 of the receptacle 110. For example, where the connector 110 and the receptacle 110 are SAE J560 compliant, the terminal openings 308, and thus the corresponding electrical connections, are arranged in a circular pattern with six of the terminal openings 308 positioned along a circumference around a central terminal opening 308, as shown in FIGS. 6-8.

The distal terminal holder 116 has various features for engaging the housing 104 and the proximal terminal holder 108. In one implementation, one or more projections 314 extend from the proximal end 302 of the body 304 for engaging corresponding features in the proximal terminal holder 108. The projections 314 may have a variety of shapes, including, but not limited to, trapezoidal, conical, pyramidal, cylindrical, spherical, rectangular, cubical, angled, contoured, and/or the like. In one implementation, a protrusion 310 extends around the body 304 transverse to the length of the body 304. The protrusion 310 includes one or more tabs 312 extending therefrom for locking the connector 100. In one implementation, the tabs 312 include indents 322 for engaging corresponding features on the locking ring 106 for locking the connector 100. The protrusion 310 may include other features for engaging other components, such as one or more openings 318. Further, as described above, a surface of the distal end 300 of the body 304 may include threads 320 for engaging the threads 218 of the housing 104 using a twisting motion. In one implementation, a guide 316 extends along a length of the body 304 from the proximal surface 306 to the protrusion 310 for guiding the assembly of the quick replacement components. The guide 316 is adapted to match the notch 214 of the rim 212 of the housing 104. The guide 316 may have a variety of shapes including, without limitation, rectangular, trapezoidal, conical, pyramidal, cylindrical, spherical, cubical, angled, contoured, and/or the like.

Figure 9:
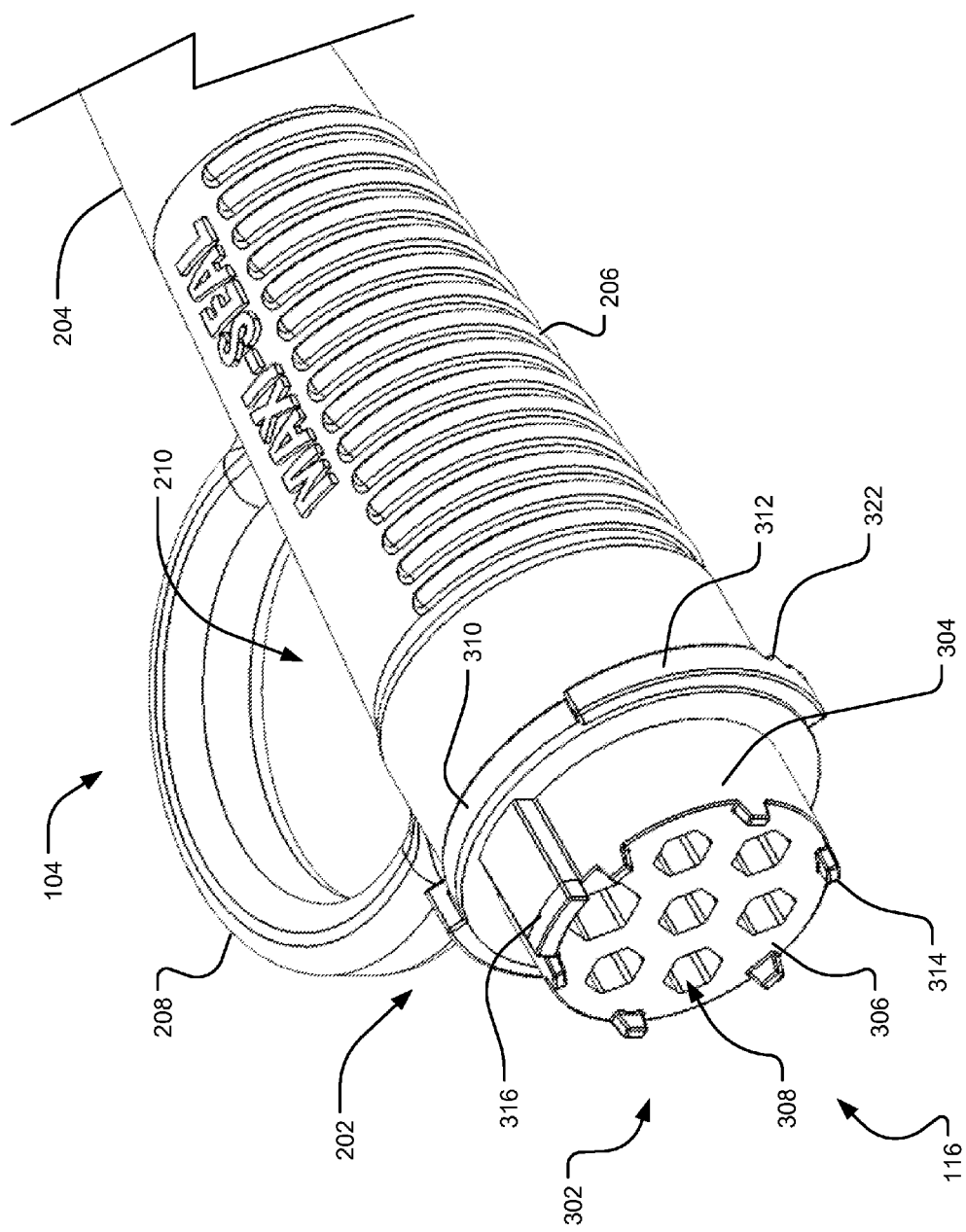
FIG. 9 depicts the distal terminal holder engaged to the cable assembly with terminals not shown for clarity.

As shown in FIG. 9, in one implementation, the distal end 300 of the distal terminal holder 118 engages the proximal end 202 of the housing 104, such that the proximal end 302 of the body 304 extends proximally from the opening 216 of the housing body 204 and the tabs 312 extend through the channels 218. The engagement between the distal terminal holder 118 and the housing 104 creates a weather and debris resistant seal.

Figure 10:
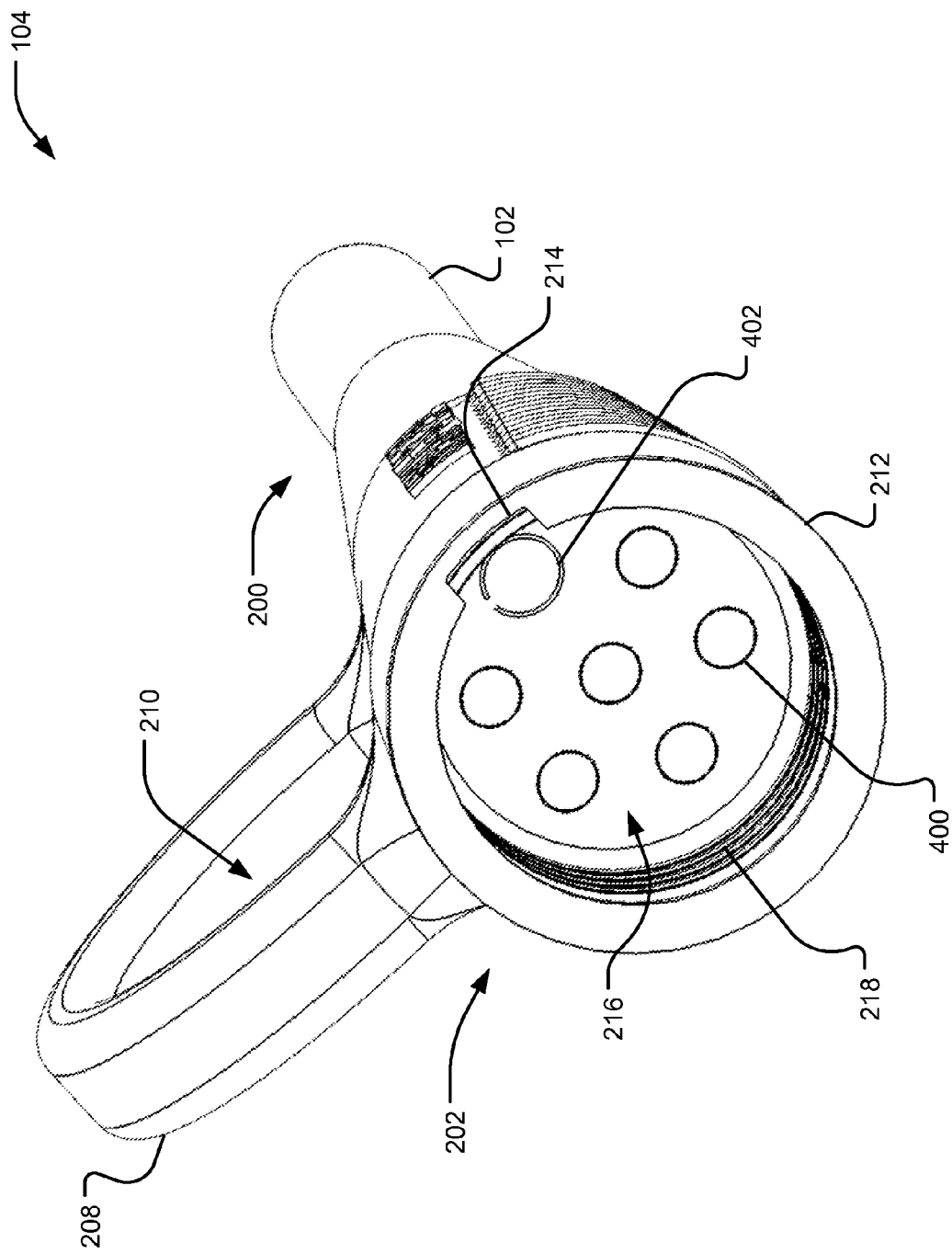
FIG. 10 shows a proximal perspective view of the cable assembly with a plurality of wire interfaces disposed within the housing.

Turning to FIGS. 10-18, in one implementation, the inner connection points include one or more terminal interfaces (e.g., small interfaces 400 and large interface 402). The terminal interfaces 400-402 may be arranged in an orientation that mirrors the pattern of the terminal openings 308, as shown in FIG. 10.

Figure 11A:
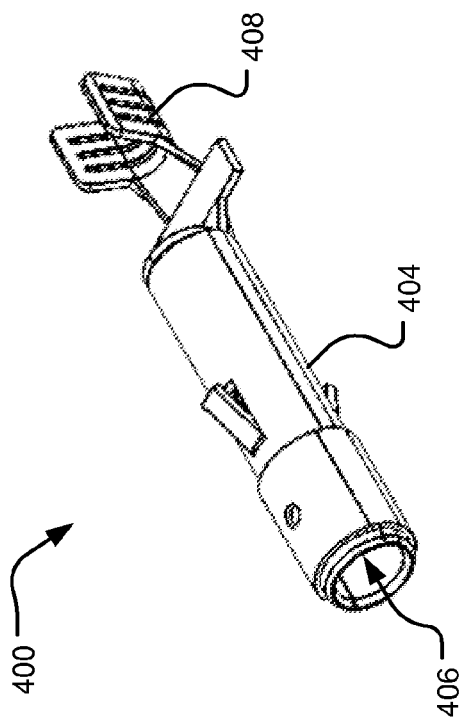
FIGS. 11A and 11B illustrate isometric and side perspective views, respectively, of an example wire interface.
Figure 11B:
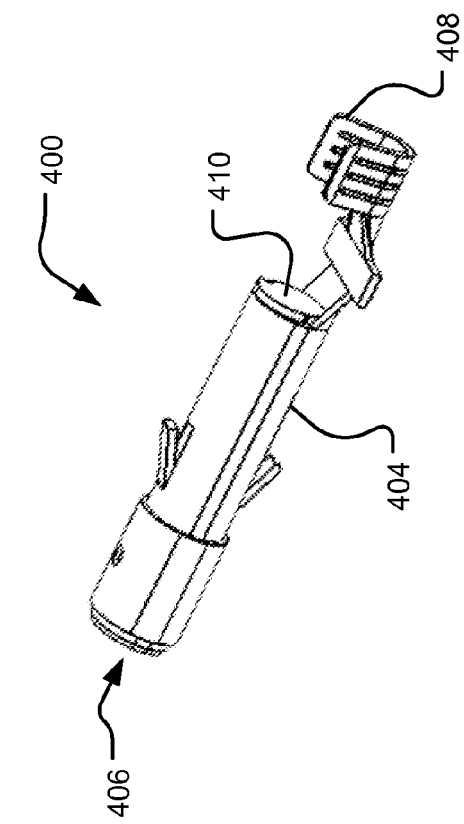
Figure 12:
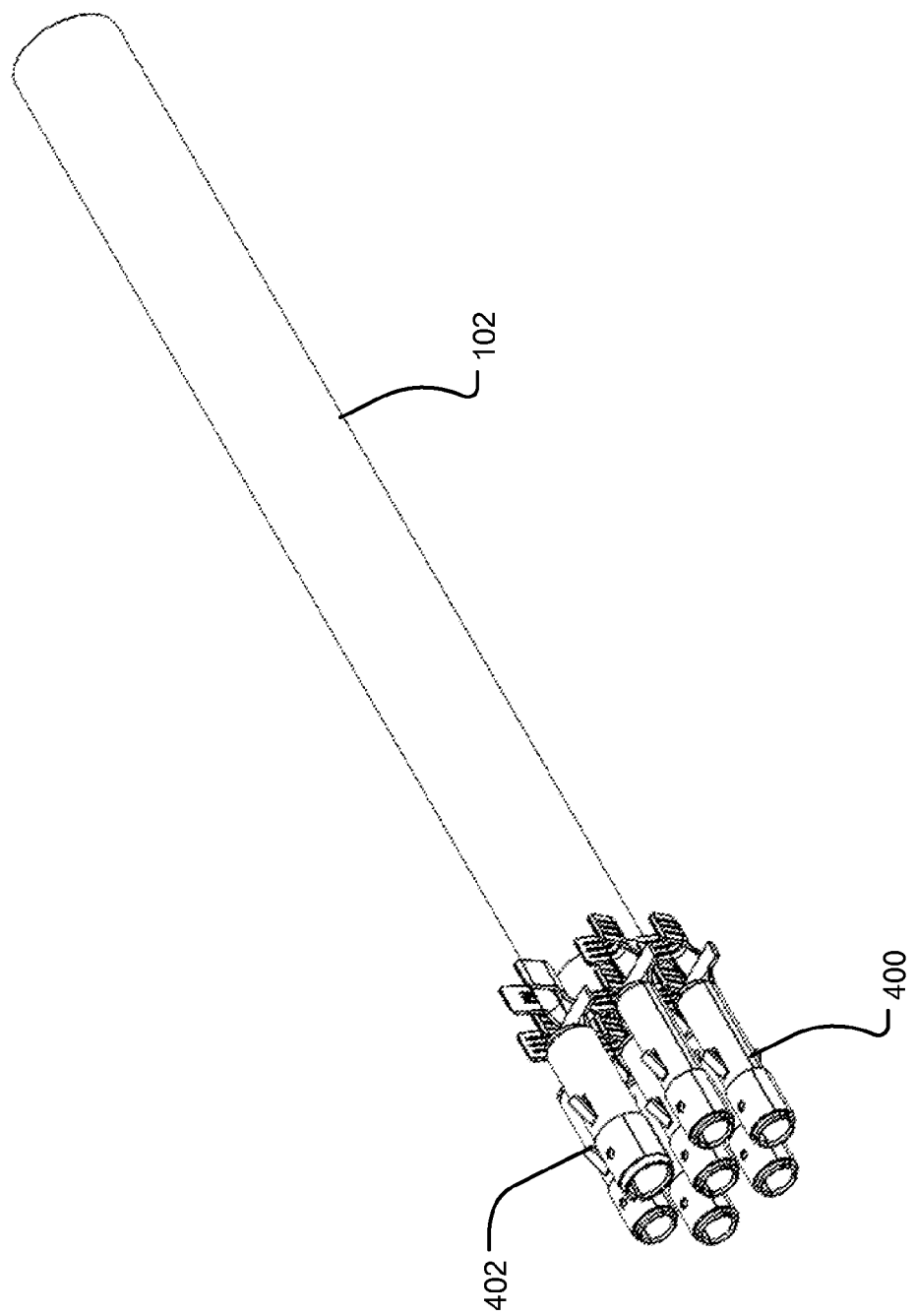
FIG. 12 shows an example cable supplying a plurality of wires to corresponding wire interfaces.

As can be understood from FIGS. 11A-12, the terminal interfaces 400 include a body 404 extending from a distal end to a proximal end. In one implementation, an opening 406 configured to receive the distal terminals 118 is disposed at the proximal end of the body 404, and an interface surface 410 is disposed at the distal end of the body 404. The interface surface 410 may be made from a variety of conducting materials adapted to electrically connect the wires of the cable 102 to the distal terminals 118. In one implementation, the terminal interfaces 400 include a wire cradle 408 for supporting a corresponding wire. For example, the insulating jacket may rest in the wire cradle 408 with the conducting portion of the wire extending proximally towards the interface surface 410 for electrical connection. The wires may connect to the interface surface 410 in a variety of manners, including, without limitation, soldering, sonic welding, wire terminators, and the like.

Figure 13:
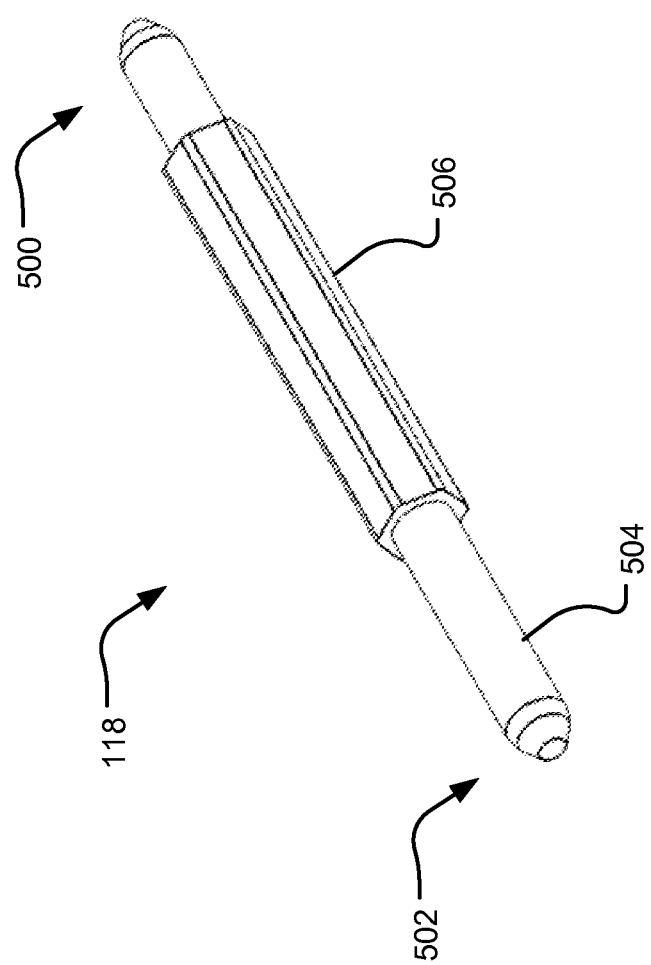
FIG. 13 illustrates an example distal terminal for connecting to a wire via a wire interface.
Figure 14:
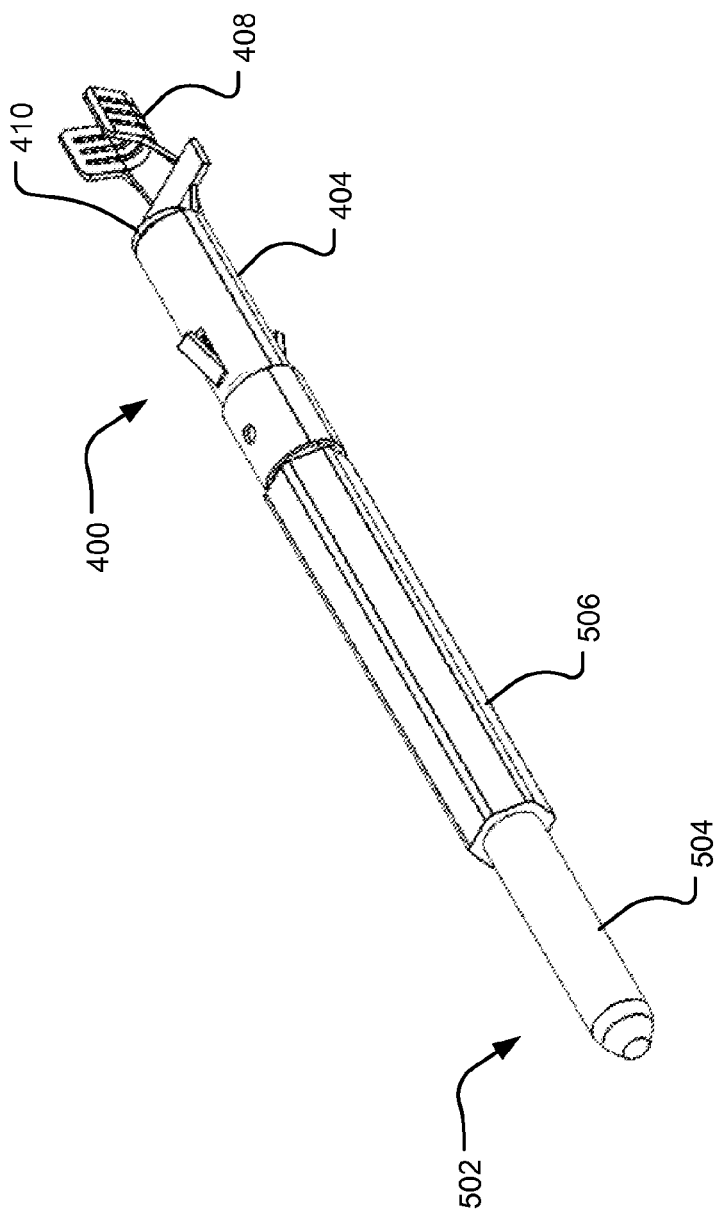
FIG. 14 depicts the distal terminal of FIG. 13 connected to the wire interface of FIGS. 11A-B.
Figure 15:
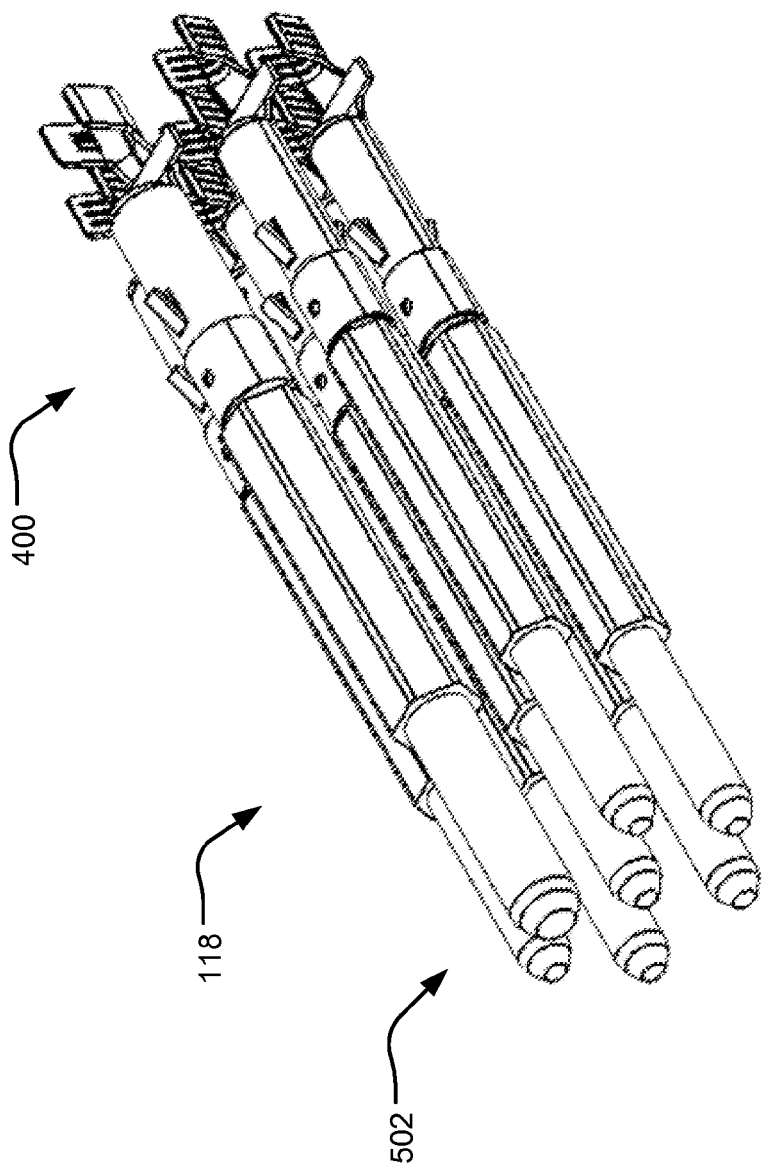
FIG. 15 shows a plurality of distal terminals connected to corresponding wire interfaces.

In one implementation, the distal terminals 118 include a conducting body 504 extending from a distal end 500 to a proximal end 502. The body 504 may be made from a variety of conducting materials and may be encased by an insulator 506. The body 504 may have a variety of shapes and sizes. For example, as shown in FIG. 13, the body 504 may be an elongated cylinder with the ends tapering outwardly. In one implementation, the opening 406 at the proximal end of the body 404 of the terminal interface 400 is configured to receive the distal end 500 of the body 504 of the distal terminal 118 to establish electrical communication between the distal terminals 118 and the wires of the cable 102, as can be understood from FIGS. 12-15.

Figure 16:
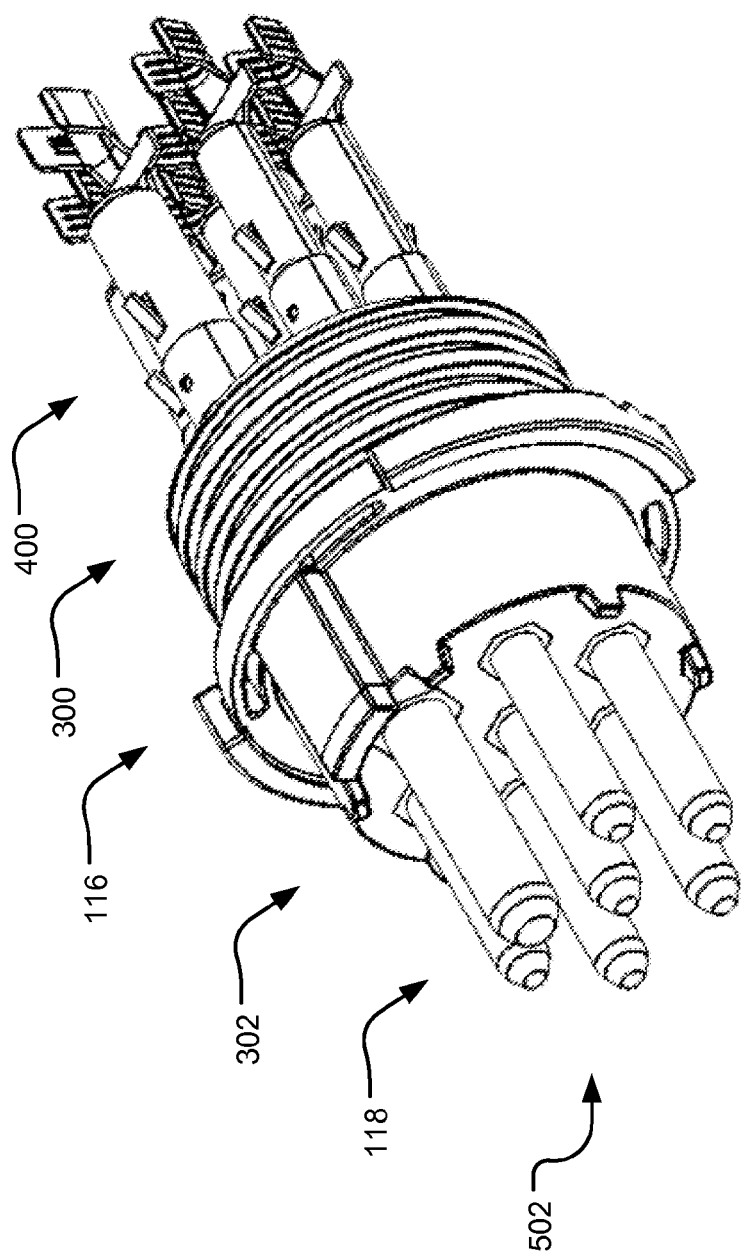
FIGS. 16 and 17 illustrate an isometric view and a distal perspective view, respectively, of the plurality of distal terminals of FIG. 15 extending through the distal terminal holder of FIG. 6.
Figure 17:
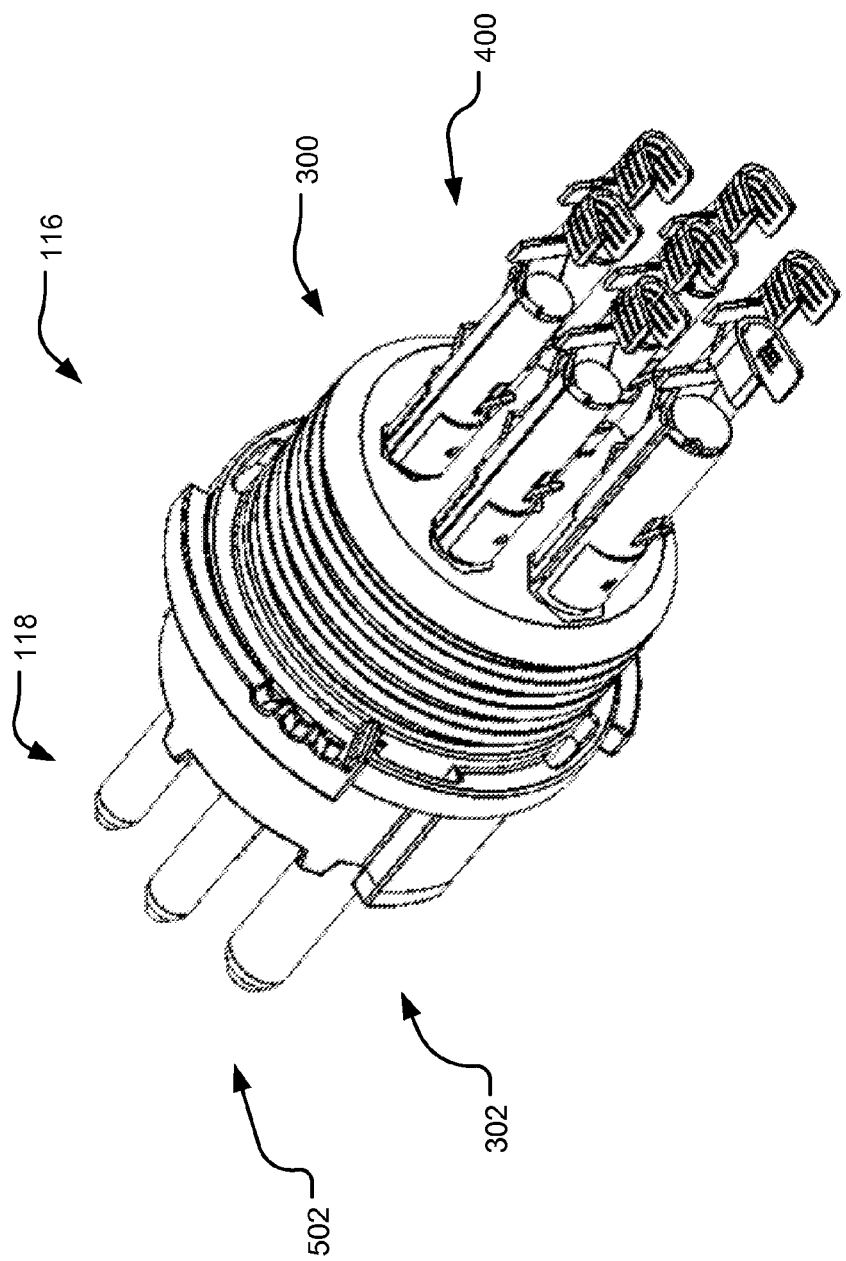
Figure 18:
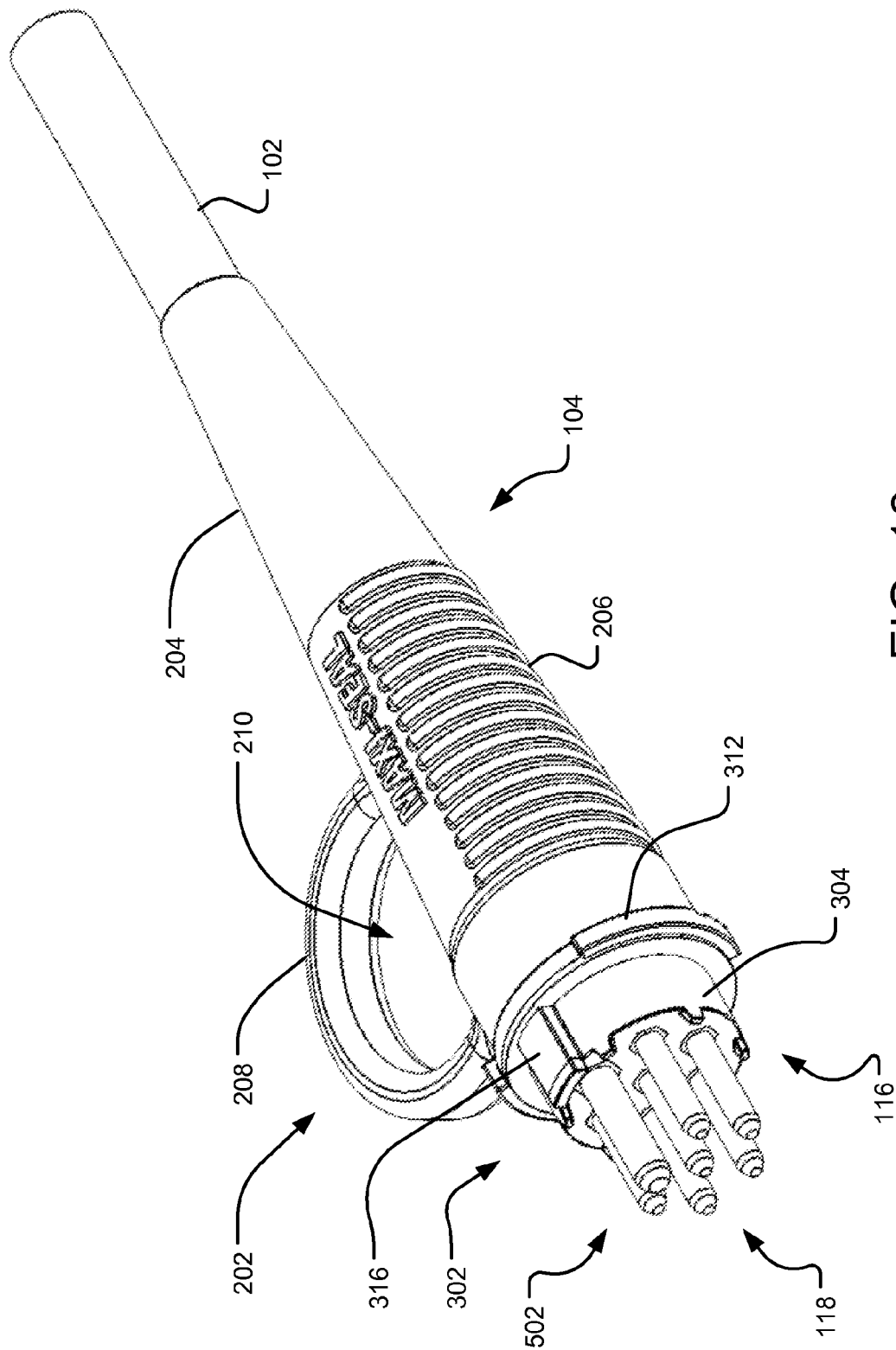
FIG. 18 depicts the distal terminal holder engaged to the cable assembly with the distal terminals extending therefrom.
Figure 19:
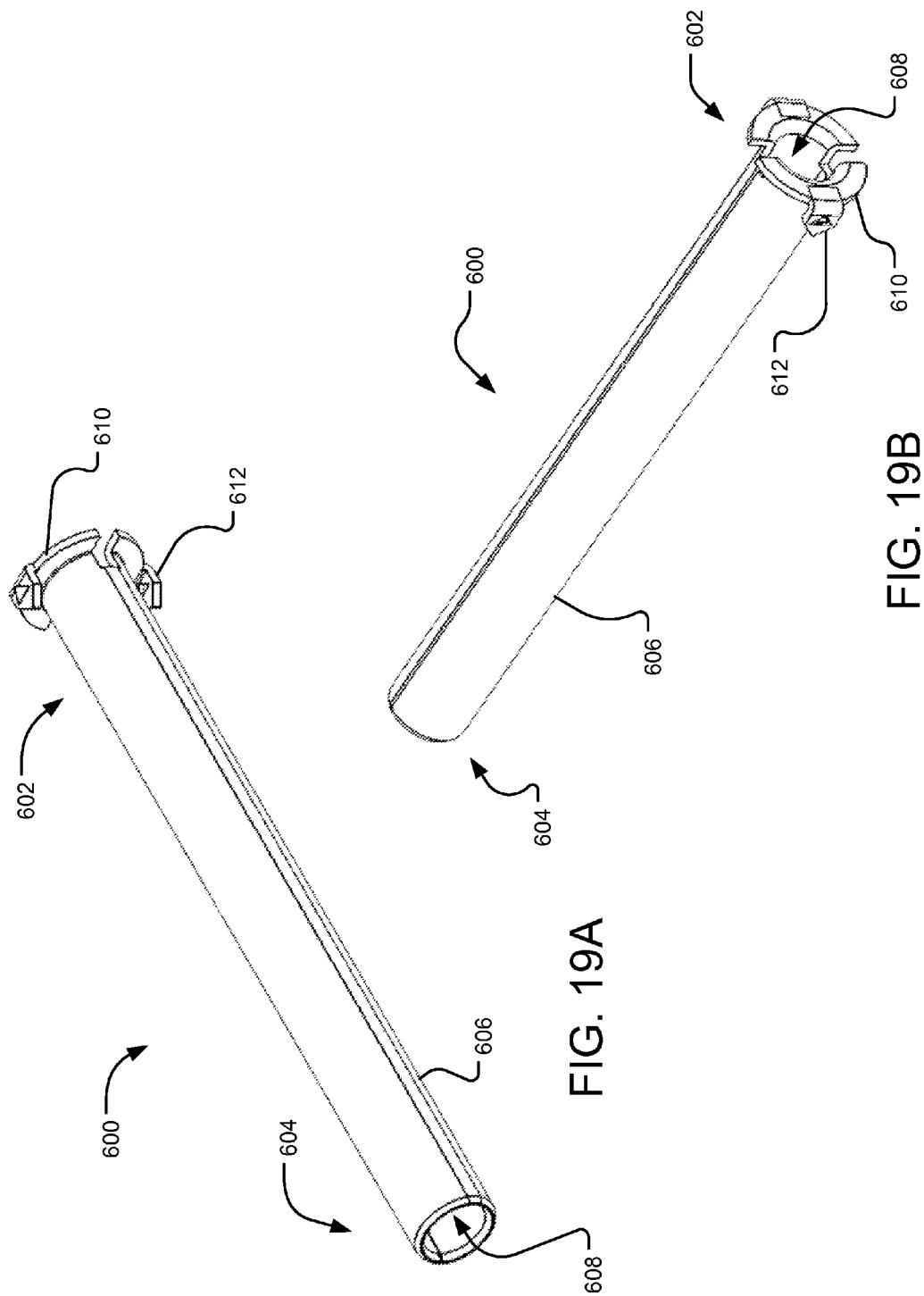
FIGS. 19A and 19B show an isometric view and a distal perspective view, respectively, of an example barrel terminal.
Figure 20:
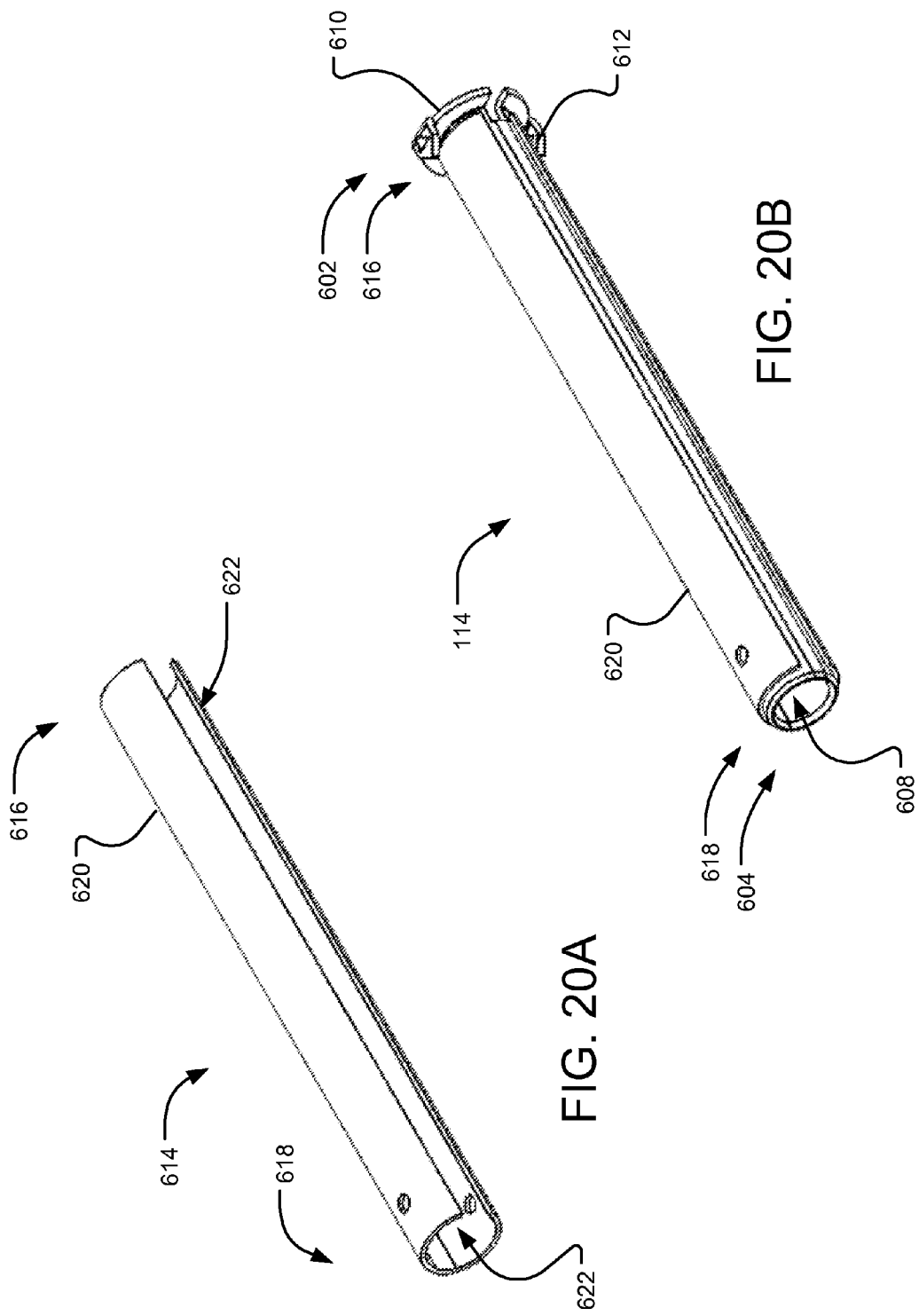
FIGS. 20A and 20B show isometric views of an example tension terminal separate from and connected to a barrel terminal, respectively, the connection of the barrel terminal and the tension terminal forming a terminal assembly.

Referring to FIGS. 15-18, the insulator 506 is configured to insulate the body 504 from the distal terminal holder 116. In one implementation, the insulator 506 is sized and shaped to mirror the size and shape of the terminal openings 308 of the distal terminal holder 116. When the distal terminals 118 are inserted the distal terminals 118 in place with the proximal ends 502 extending from the proximal surface 306 of the distal terminal holder 116, as shown in FIGS. 16-18. In one implementation, the distal terminals 118 may be removed from the terminal openings 308 as needed for maintenance.

For a detailed description of the terminal assemblies 114, reference is made to FIGS. 19A-23. In one implementation, each terminal assembly 114 includes a barrel terminal 600 configured to establish electronic communication between the distal terminals 118 and the proximal terminals 112 of the receptacle 110, thereby establishing an electronic connection between the towing vehicle and the towed vehicle.

As can be understood from FIGS. 19A-19B, in one implementation, the barrel terminal 600 includes a conducting body 606 extending between a distal end 602 and a proximal end 604 with an opening 608 extending therethrough. The conducting body 606 may have a variety of shapes an sizes. For example, the conducting body 606 may cylindrical. However, other shapes and sizes configured to match the sizes and shapes of the distal terminals 118 and the proximal terminals 112 are contemplated.

In one implementation, the distal end 602 of the barrel terminal 600 includes an edge 610 configured to contact the proximal surface 306 of the distal terminal holder 116, such that the opening 608 of the barrel terminal 600 receives the proximal end 502 of the distal terminal 118. The edge 610 may having engaging features, such as one or more tabs 612 configured to engage corresponding features in the proximal terminal holder 108, as described with respect to FIGS. 24A-25.

The barrel terminal 600 may be configured to removably engage the proximal end 502 of the distal terminals 118 in a variety of manners, including, for example, using a tension force. In one implementation, the tension force is created using a tension terminal 614, which includes a body 620 extending from a distal end 616 to a proximal end 618. An opening 622 extends through the body 620 with a channel 622 defined in the body 620 creating access to the opening 622 along a length of the body 620. In one implementation, the tension terminal 614 is sized and shaped to mirror the size and shape of the barrel terminal 600.

Figure 21:
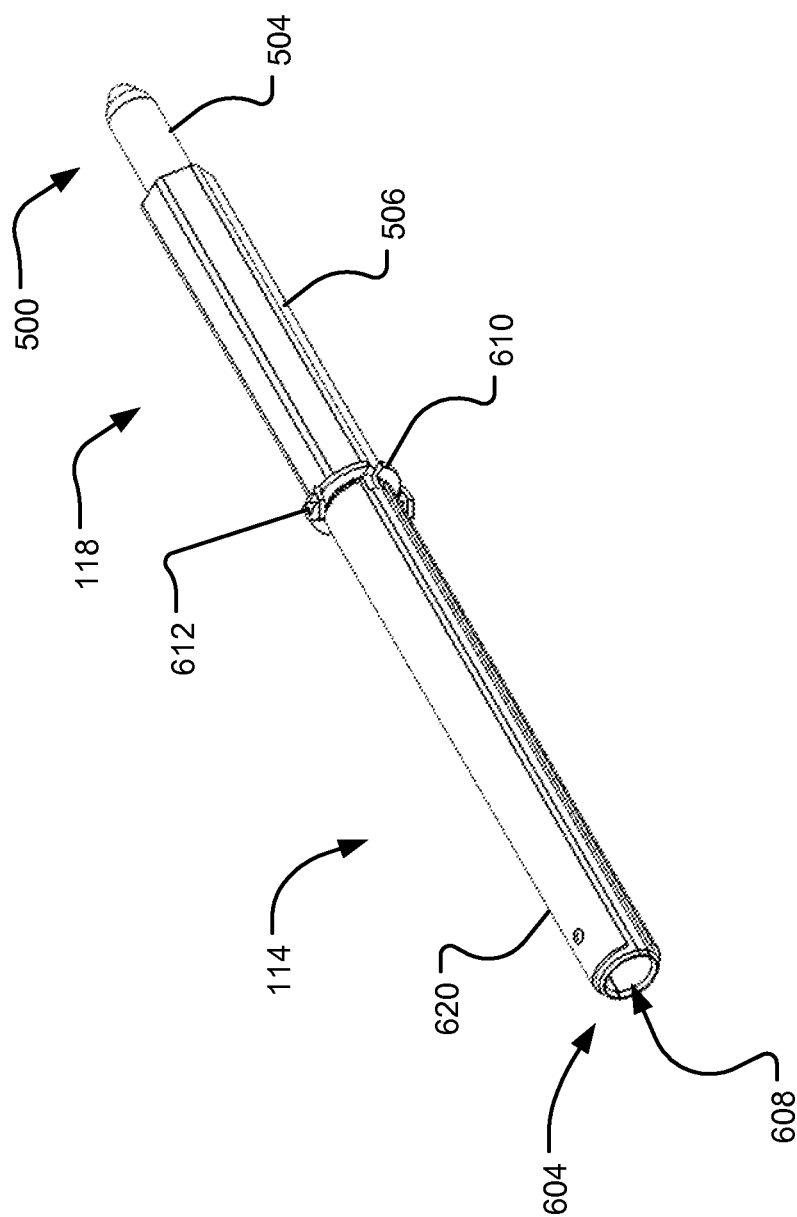
FIG. 21 illustrates a distal terminal connected to the terminal assembly of FIG. 20B.
Figure 22:
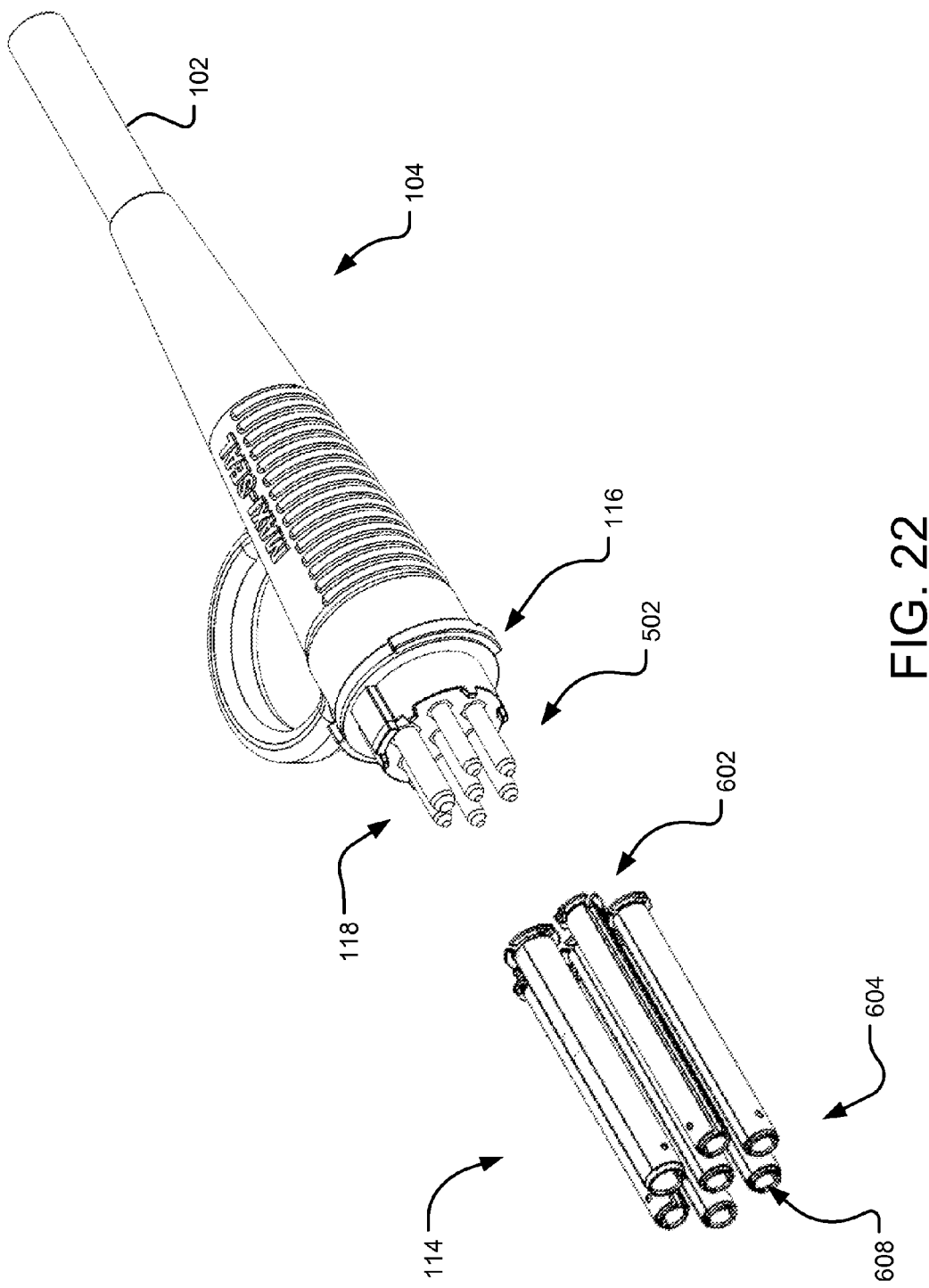
FIGS. 22 and 23 show a plurality of distal terminals separate from and connected to a plurality of terminal assemblies, respectively.
Figure 23:
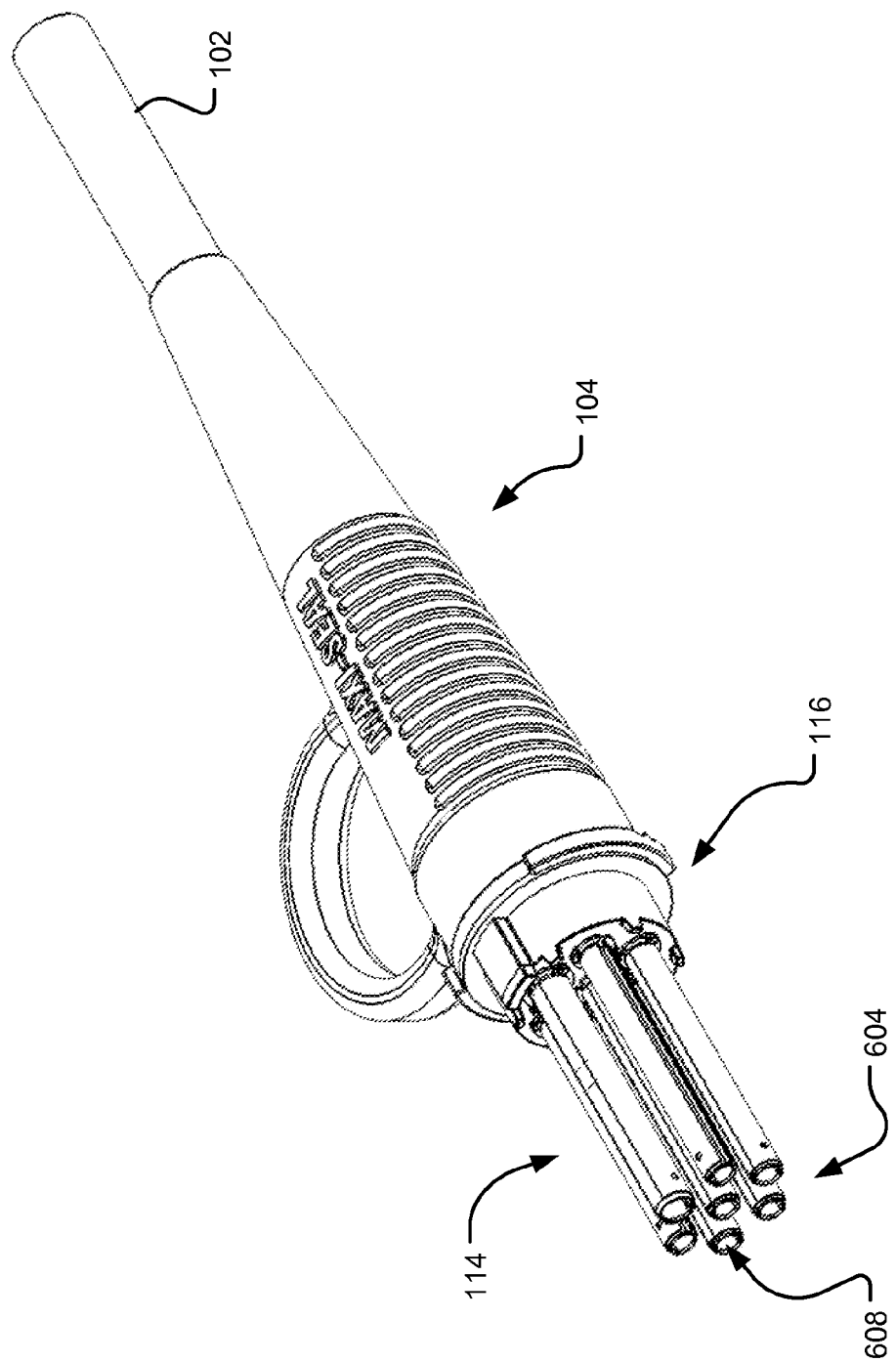

As shown in FIGS. 21-23, once the tension terminal 614 is engaged to the barrel terminal 600 to form the terminal assembly 114, the opening 608 at the distal end is configured to receive the proximal end 502 of the distal terminal 118. Once the distal terminals 118 are inserted into the terminal assemblies 114, an inward bias of the tension terminals 614 creates tension between an inner surface of the barrel terminals 600 and the bodies 504 of the distal terminals 118. The terminal assemblies 114 are then removably engaged to the distal terminals 118 and positioned for connection to the proximal terminals 112. Once the proximal terminals 112 are received by the terminal assemblies 114, electronic communication between the distal terminals 118 and the proximal terminals 112 of the receptacle 110 is established.

Figure 25:
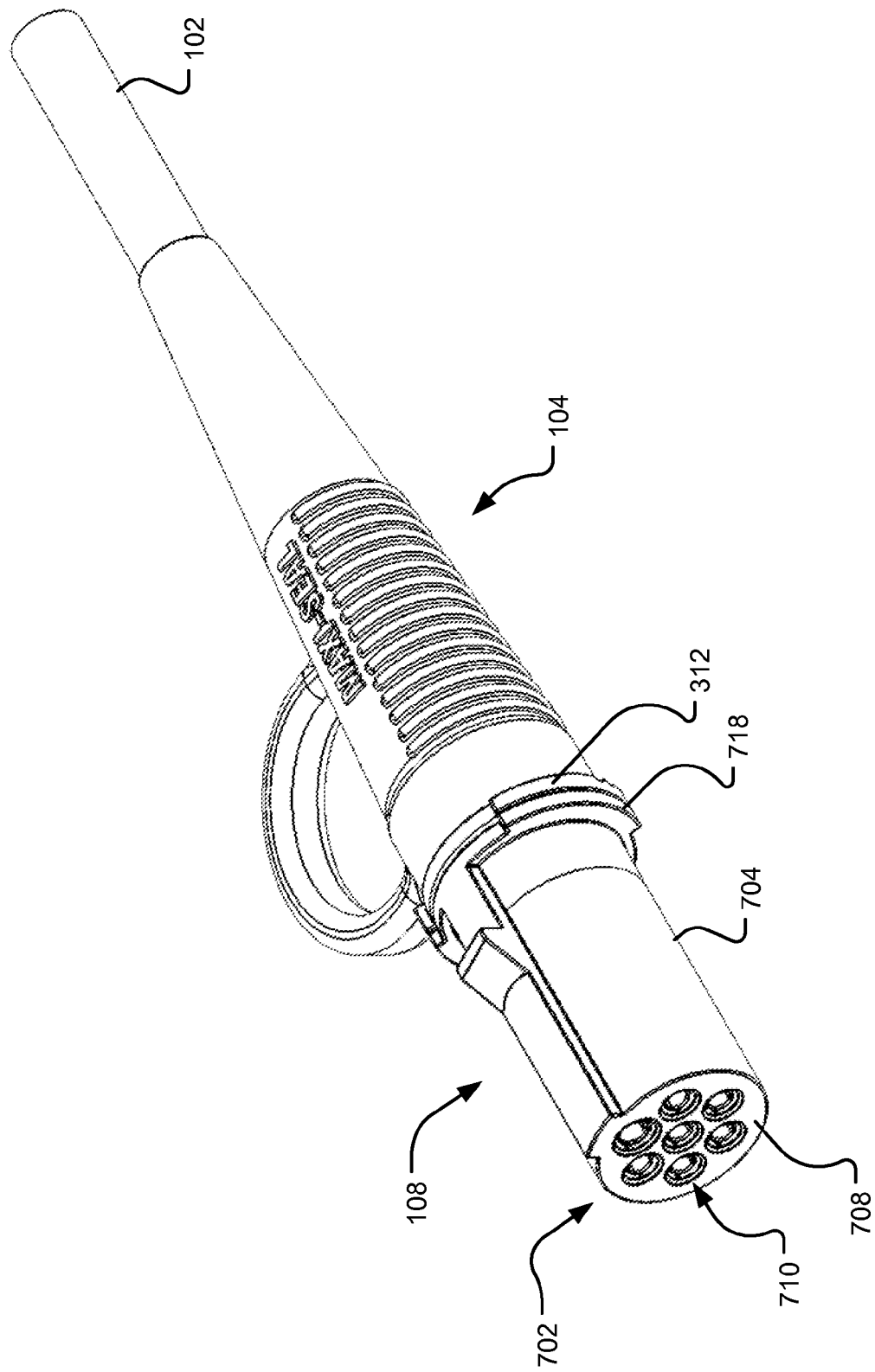
FIG. 25 shows the proximal terminal holder of FIGS. 24A and 24B connected to the distal terminal holder with the plurality of terminal assemblies extending therethrough.

Turning to FIGS. 24A-25, a detailed description of the proximal terminal holder 108 is provided. In one implementation, the proximal terminal holder 108 includes a body 704 extending between a distal end 700 and a proximal end 702.

One or more terminal openings 710 extend through the body 704 from a proximal surface 708 to a distal surface 720. The terminal openings 710 are sized and shaped to receive and hold the terminal assemblies 114. In one implementation, the terminal openings 710 and the corresponding terminal assemblies 114 may be different sizes depending on the wire connection, and thus the size of the distal terminals 118 and the proximal terminals 112. Moreover, the terminal openings 710 may be arranged in a variety of orientations depending on the orientation of the proximal terminals 112 of the receptacle 110 and the distal terminals 112 of the connector 100. For example, where the connector 110 and the receptacle 110 are SAE J560 compliant, the terminal openings 710, and thus the corresponding electrical connections, are arranged in a circular pattern with six of the terminal openings 710 positioned along a circumference around a central terminal opening 710, as shown in FIGS. 24A-24B.

The proximal terminal holder 108 has various features for engaging the terminal assemblies 114 and the distal terminal holder 116. In one implementation, one or more slots 722 are defined in the distal surface 720 for engaging corresponding features in the distal terminal holder 116, such as the projections 314. The shape and size of the slots 722 mirrors the size and shape of the projections 314, which may include, without limitation, trapezoidal, conical, pyramidal, cylindrical, spherical, rectangular, cubical, angled, contoured, and/or the like.

In one implementation, a protrusion 716 extends around the body 704 transverse to the length of the body 704 and positioned at the distal end 700. The protrusion 716 includes one or more tabs 718 extending therefrom for locking the connector 100. In one implementation, the protrusion 716 and the tabs 718 are adapted to match the size and shape of the protrusion 310 and the tabs 312 of the distal terminal holder 116. Similarly, in one implementation, the distal surface 720 of the proximal terminal holder 108 may include slots positioned around each of the terminal openings 710 adapted to receive and engage the tabs 612 of the terminal assemblies 114.

In one implementation, a guide 712 extends along a length of the body 704 from the proximal surface 708 to a notch 716 at the distal end 700 for guiding the assembly of the quick replacement components. The notch 716 is configured to orient the proximal terminal holder 108 to the notch 214 of the rim 212 on the housing 104 and the guide 316 of the distal terminal holder 116. The notch 716 is configured to receive the guide 316 of the distal terminal holder 116 into the guide of the proximal terminal holder 108 by sliding the proximal terminal holder 108 over the distal terminal holder 116 until the notches 214 and 716 meet and the distal surface 720 of the proximal terminal holder 108 meets the proximal surface 306 of the distal terminal holder 116. The various orientation and guiding features of the proximal terminal holder 108, the distal terminal holder 116, the housing 104, and the receptacle ensure proper alignment between the wires of the cable 102 and the proximal terminals 112, thereby establishing operation of the various electronic systems in the towed vehicle.

As shown in FIG. 25, in one implementation, the distal end 700 of the proximal terminal holder 108 engages the proximal end 302 of the distal terminal holder 116, such that the terminal assemblies 114, the distal terminals 118, and the distal terminal holder 116 is enclosed and protected. The openings 710 on the proximal surface 708 are configured to receive the proximal terminals 112 to establish an electronic connection between the connector 100 and the receptacle 110 for towing.

Figure 26:
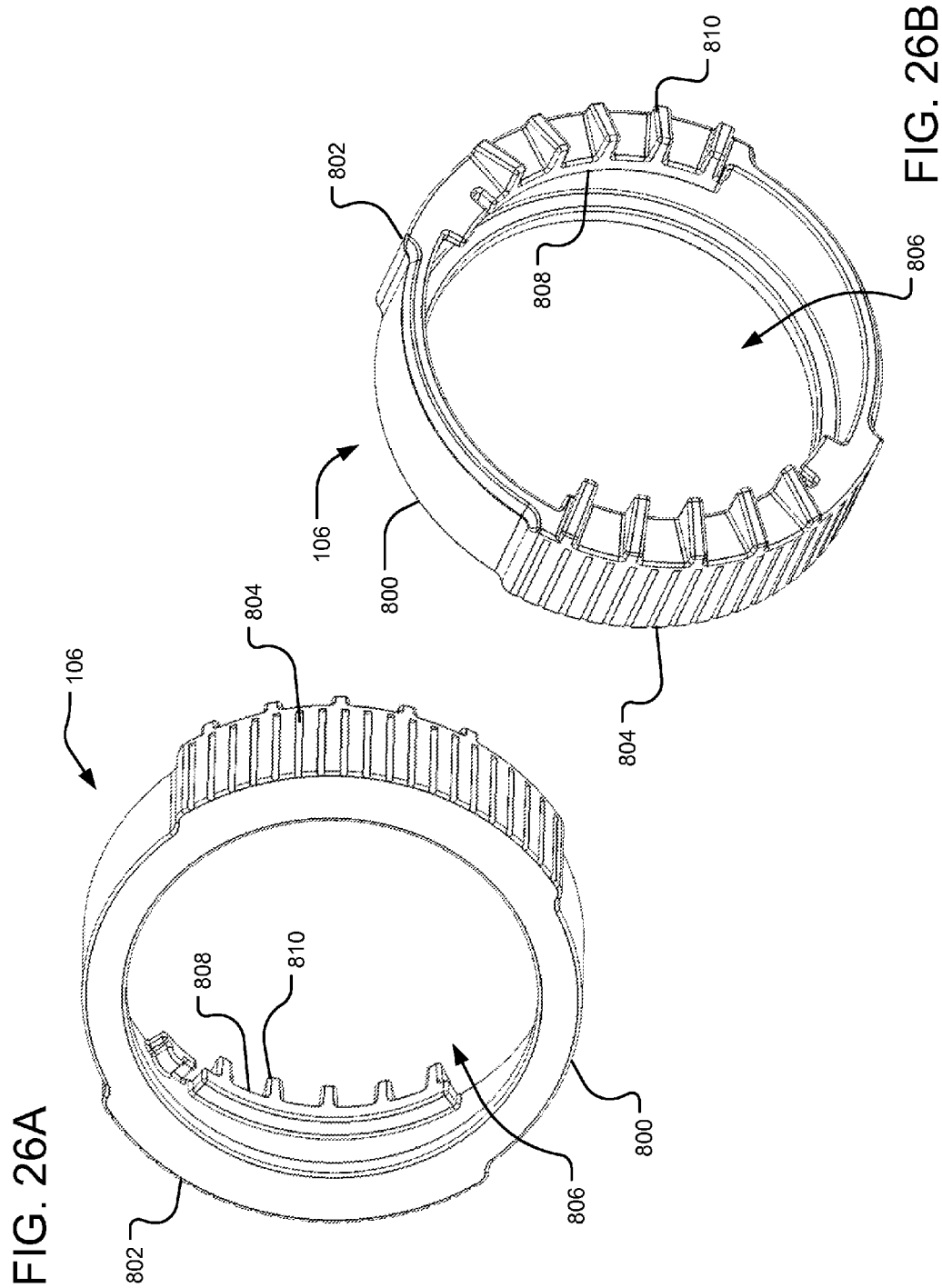
FIGS. 26A and 26B depict an isometric view and a distal perspective view, respectively, of an example locking ring.
Figure 27:
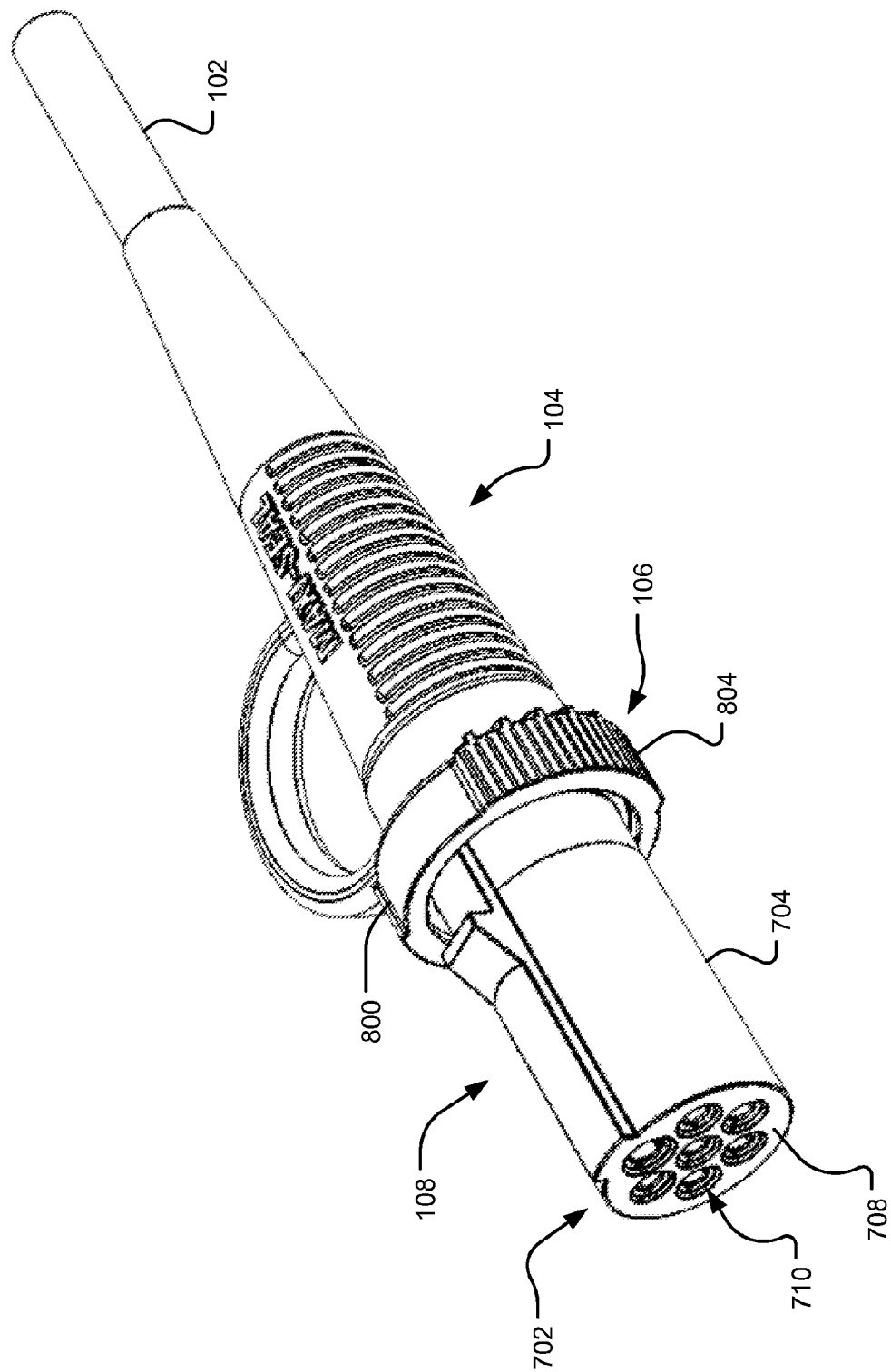
FIG. 27 shows an isometric view of the locking ring locking the proximal terminal holder in place.

To ensure that the connector 100 is secure after assembly, in one implementation, the locking ring 106 removably engages the tabs 718 and 312 of the proximal terminal holder 108 and the distal terminal holder 116, as can be understood from FIGS. 26A-27.

In one implementation, the locking ring 106 includes a body 800 extending around a central point to create an opening 806 that matches the size and shape of the body 704 of the proximal terminal holder 108. The body 800 includes one or more ridges 802 with gripping features 804 to facilitate locking. The gripping features 804 may be grooves or textures in the surface of the ridges 802 to create a friction and/or leverage to assist in a twisting motion of the locking ring 106 for engaging the tabs 718 and 312 to hold the connector 100 together as shown in FIG. 27. In one implementation, to ensure a secure connection between the locking ring 106 and the tabs 718 and 312, the locking ring 106 includes one or more shelves 808 with teeth 810 protruding therefrom to engage features in the tabs 718 and 312. For example, the teeth 810 may be adapted to engage the indents 322 defined in the tab 312 of the distal terminal holder 116.

Figure 28:
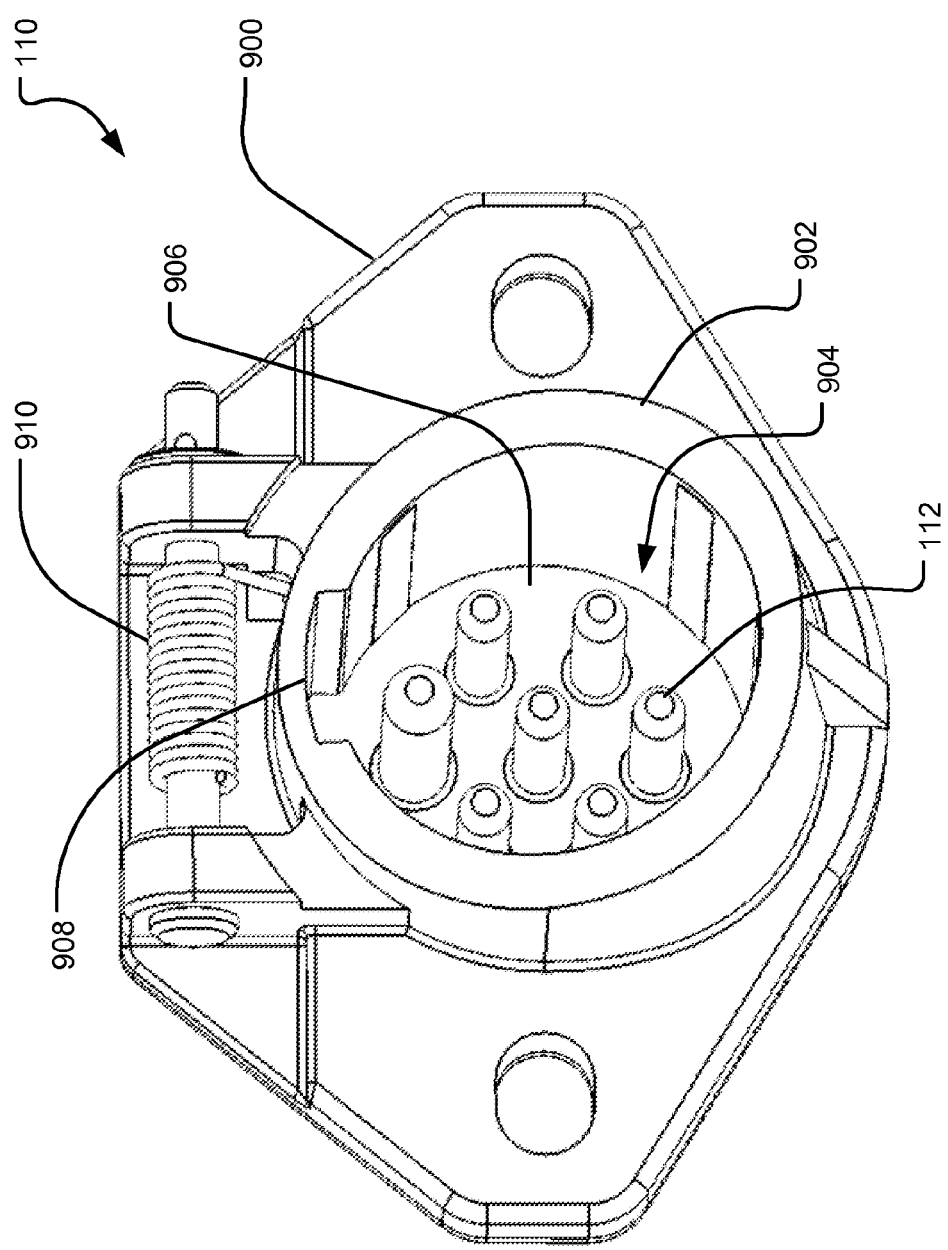
FIGS. 28 and 29 illustrate a distal perspective view and a side perspective view, respectively, of a plug receptacle.
Figure 29:
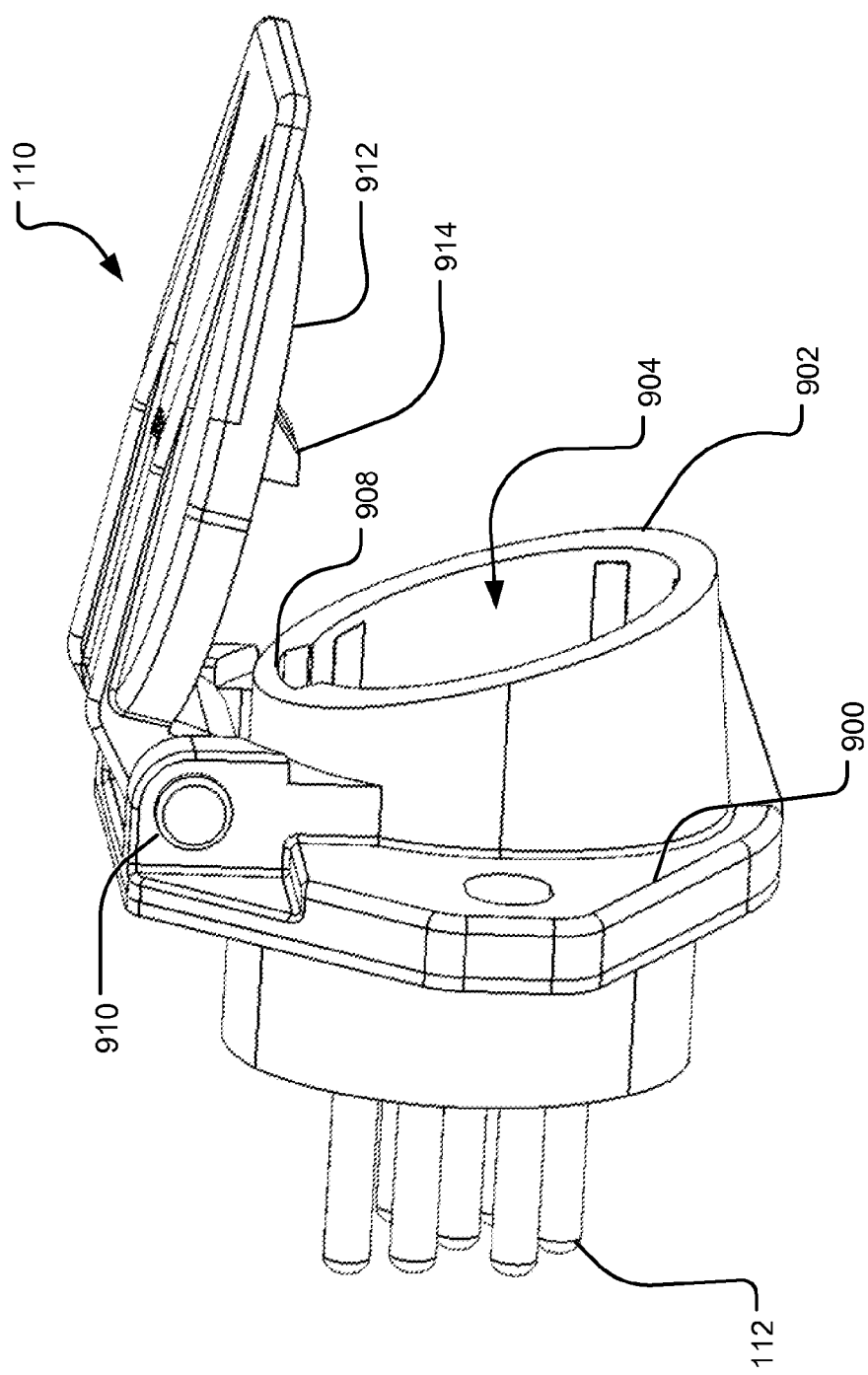

Once the connector 100 is assembled as shown in FIG. 27, the connector 100 may be removably connected to the receptacle 110 to establish an electrical connection between the towing vehicle and the towed vehicle. For a detailed description of the receptacle 110, reference is made to FIGS. 28-29.

In one implementation, the receptacle 110 includes a body 900 adapted to be mounted onto or otherwise engage the towed vehicle. A projecting body 902 extends through the body 900 to create an opening 904 to a distal surface 906. The proximal terminals 112 extend through the projecting body 902 and from the distal surface 906. In one implementation, the projecting body 902 is adapted to receive the proximal surface 708 of the proximal terminal holder 108, such that the proximal terminals 112 are inserted into the terminal openings 710 to connect to the distal terminals 118 via the terminal assemblies 114, thereby creating the electronic connection between the receptacle 110 and the connector 100. The projecting body 902 may include a notch 908 adapted to receive the guide 712 to assist with insertion and orientation of the connector. In one implementation, to ensure that the connector 100 is securely engaged to the receptacle 110 during towing, the receptacle 110 includes a latch 912 connected to the body 900 using a spring assembly 910 and adapted to engage the proximal terminal holder 108. For example, the latch 912 may include a lock 914 adapted to releasably engage a corresponding lock 714 on the proximal terminal holder 108 for secure towing.

When the connector 100 is not in use for towing, the connector 100 is separated from the receptacle 110 and may be disassembled for maintenance by removing the locking ring 106 followed by the proximal terminal holder 108 and the terminal assemblies 114. Components of the connector 100, such as the distal terminals 18 and the terminal assemblies 114, may be replaced, repaired, or otherwise maintained. After maintenance, the connector 100 may be reassembled for towing.

FIG. 30 illustrates example operations 1000 for assembling a quick replacement connector. In one implementation, an operation 1002 connects one or more incoming wires to a distal end of corresponding terminals in a housing. Each of the wires may be connected to the distal end of the terminal using a terminal interface. A proximal end of the terminals extends from the housing through a distal terminal holder.

An operation 1004 fits a distal end of a terminal assembly over a proximal end of each of the terminals. In one implementation, a single terminal assembly is fitted over the proximal ends of the terminals. In another implementation, a plurality of terminal assemblies is provided, with each assembly fitting over a corresponding terminal. In each implementation, each of the terminals extends into an opening of the terminal assembly at the distal end, such that an opening at the proximal end of the terminal assembly is positioned to receive corresponding terminals of a receptacle.

An operation 1006 positions a proximal terminal holder adjacent to the distal terminals holder, such that the proximal terminal holder is positioned to receive the terminal assembly or assemblies. An operation 1008 engages the proximal terminal holder to the distal terminal holder to assemble the connector. A locking ring may be used to secure the assembly. An operation 1010 engages a plug receptacle to the proximal terminal holder to establish an electrical connection between a towing vehicle and a towed vehicle.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure, as defined in the claims that follow.

What is claimed is:

1. A connector for quick maintenance comprising:
a cable assembly having a cable bundling a plurality of wires extending into and terminating within a housing;
a handle projecting from a body of the housing, the housing body extending between a proximal end and a distal end, the handle positioned near the proximal end of the housing body and the cable extending into the housing at the distal end of the housing body;
a distal terminal holder disposed within an opening of the housing body at the proximal end, the distal terminal holder having a surface oriented in a direction away from the housing body;
a plurality of terminals extending from the surface of the distal terminal holder, each of the terminals in electrical communication with one of the wires;
a plurality of terminal assemblies, each having a distal opening into which one of the terminals extends; and
a proximal terminal holder having a plurality of terminal openings extending from a distal surface to a proximal surface, each of the terminal assemblies extending through one of the terminal openings.

2. The connector of claim 1, wherein a proximal opening of each of the terminal assemblies is configured to receive a corresponding terminal of a receptacle to establish electrical communication between the corresponding terminal and one of the wires.

3. The connector of claim 1, further comprising: a locking ring configured to releasable engage at least one of the proximal terminal holder or the distal terminal holder.

4. The connector of claim 3, wherein the locking ring is configured to engage tabs of at least one of the proximal terminal holder or the distal terminal holder.

5. The connector of claim 1, wherein the terminal assemblies each include a barrel terminal having a conducting body, the proximal opening and the distal opening forming a continuous opening through the conducting body.

6. The connector of claim 5, wherein the terminal assemblies each include a tension terminal extending around the conducting body of the barrel terminal.

7. The connector of claim 1, wherein the proximal terminal holder is separable from each of the distal terminal holder and the terminal assemblies.

8. A connector for quick maintenance comprising:
a housing having a housing body extending between a proximal end and a distal end and a housing opening extending through a length of the housing body;
a distal terminal holder disposed within the housing opening at the proximal end of the housing body, the distal terminal configured to releasably hold one or more terminals;
one or more terminal assemblies having one or more openings into which the one or more terminals extend;
a proximal terminal holder having one or more terminal openings configured to receive the one or more terminal assemblies; and
a locking ring configured to releasably engage the distal terminal holder to the proximal terminal holder.

9. The connector of claim 8, wherein the housing body includes a handle disposed near the proximal end.

10. The connector of claim 8, wherein the one or more terminal assemblies are configured to establish electrical communication between the one or more terminals and one or more corresponding terminals of a receptacle.

11. The connector of claim 8, wherein the one or more terminals includes seven terminals.

12. The connector of claim 11, wherein the seven terminals are arranged in a circular orientation with six terminals positioned at a circumference around a central terminal.

13. The connector of claim 8, wherein the locking ring is configured to releasably engage the distal terminal holder to the proximal terminal holder using a twisting motion.

* * * * *